United States Patent [19]
Paradis

[11] Patent Number: 5,435,155
[45] Date of Patent: Jul. 25, 1995

[54] HIGH-EFFICIENCY LIQUID CHILLER

[76] Inventor: Marc A. Paradis, 853 Rochette, Ste-Foy, Quebec, Canada, G1V 2S6

[21] Appl. No.: 169,304

[22] Filed: Dec. 15, 1993

[30] Foreign Application Priority Data

Jun. 18, 1991 [CA] Canada .................................. 2044825

[51] Int. Cl.$^6$ .......................... F25B 47/00; F25C 3/04; F25C 5/02; F28F 9/02
[52] U.S. Cl. ......................................... 62/515; 62/66; 165/135
[58] Field of Search .................... 165/135; 62/74, 335, 62/114, 515, 1, 476, 66

[56] References Cited

U.S. PATENT DOCUMENTS

| 1,020,675 | 3/1912 | Zeigler | 165/135 |
|---|---|---|---|
| 2,037,316 | 4/1936 | Fenske | 165/135 |
| 2,085,677 | 6/1937 | Thayer | 165/135 |
| 2,596,195 | 5/1952 | Arbuckle | 62/335 |
| 3,015,940 | 1/1962 | Harwich | 62/335 |
| 3,824,804 | 7/1974 | Sandmark | 62/335 |
| 4,027,497 | 6/1977 | Thurman | 62/275 X |
| 4,226,279 | 10/1980 | Eisinger et al. | 165/1 |
| 4,488,407 | 12/1984 | Delano | 62/74 |
| 4,671,077 | 6/1987 | Paradis | 62/324.1 |
| 4,972,676 | 11/1990 | Sakai | 62/18 |
| 5,123,262 | 6/1992 | Laude-Bousquet | 62/434 |
| 5,186,012 | 2/1993 | Czachorsk et al. | 62/114 |

FOREIGN PATENT DOCUMENTS 4353376 12/1992 Japan .................................. 62/74

Primary Examiner—Henry A. Bennet
Assistant Examiner—William C. Doerrler

[57] ABSTRACT

A liquid cooling system capable of generating very cold liquid flows, comprising sending said liquid (5) to a heat pump circuit; said circuit including a hot-side heat exchanger (HSHE) and a cold-side heat exchanger (CSHE); said CSHE being provided with conduit means (10) through which said liquid (5) flows; said conduit means (10) being in contact with and being cooled externally by cold medium (10). The improvement in the system comprising the installation of proper thermal barriers between said cold medium and said liquid in all areas where the velocity of said liquid is much lower than the average velocity found inside said conduit means (10); said improvement also comprising proper design of the entrance (3a) of said conduit means (10) to prevent flow detachment; said design preventing any freeze-up of said liquid (5) as well as improving efficiency and durability. An alternative to the above said improvement is simply the elimination of all areas where the velocity of said liquid is much lower than the average velocity found inside said conduit means. Other alternatives are proposed. Apparatus is disclosed. The improvement in the system also comprising the capability to generate and manipulate supercooled liquids in a way that prevents liquid line and cooler freeze-ups. The improvement in the system also comprising new vapor compression cycles as well as new absorption cycle arrangements. Applications in very diversified fields are described. The technology is given the name "SUPER-PAC", which stands for "SUPER Pompe A Chaleur", or super heat pump.

35 Claims, 13 Drawing Sheets

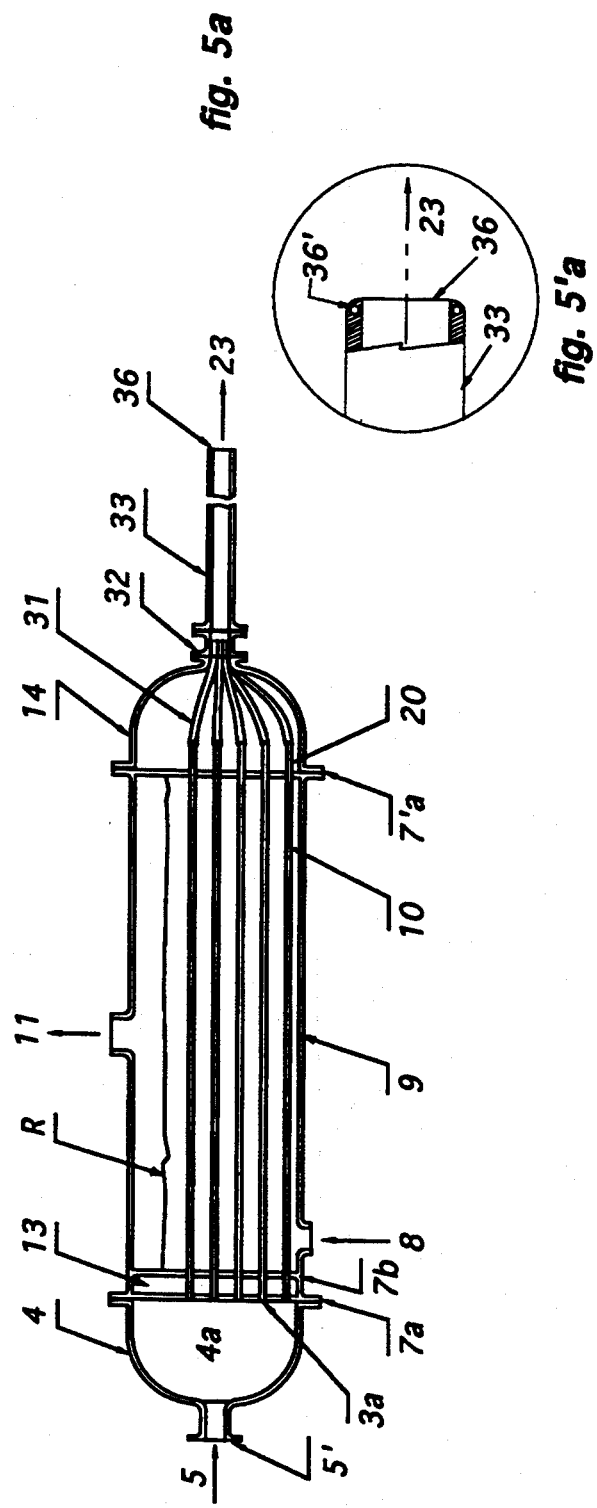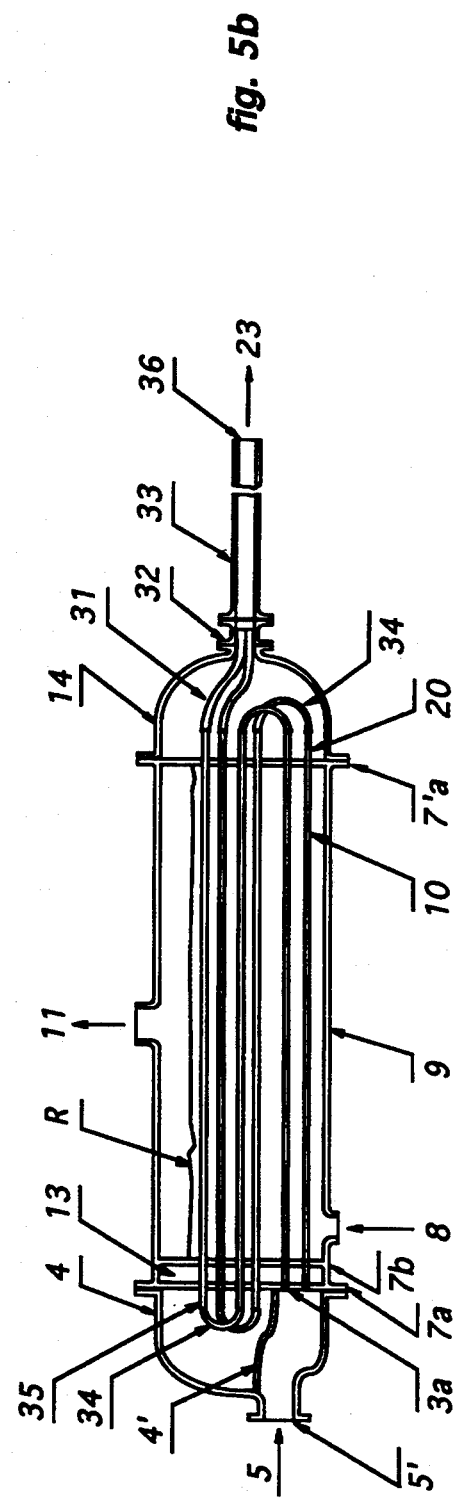

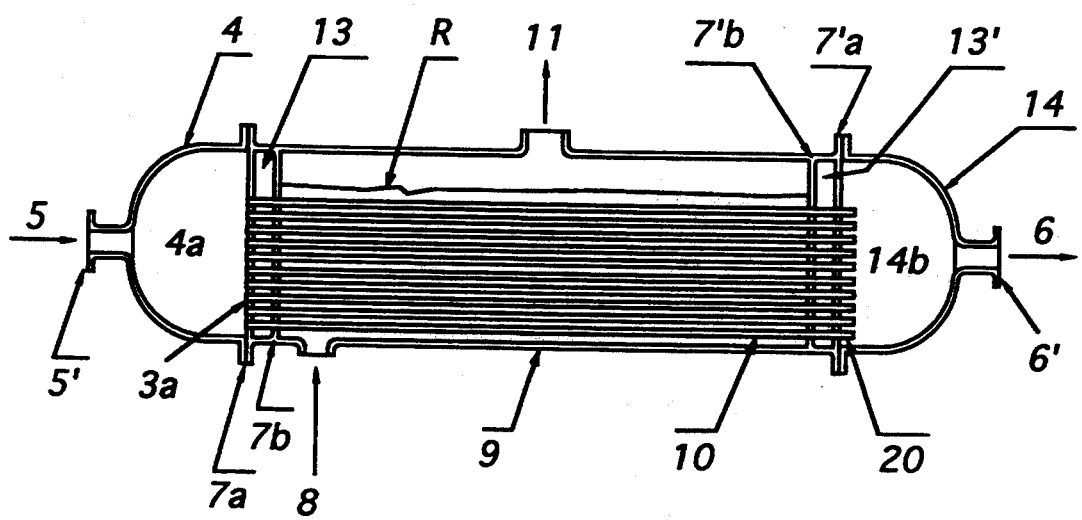
fig. 5c
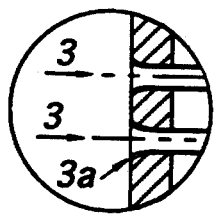
fig 5'c

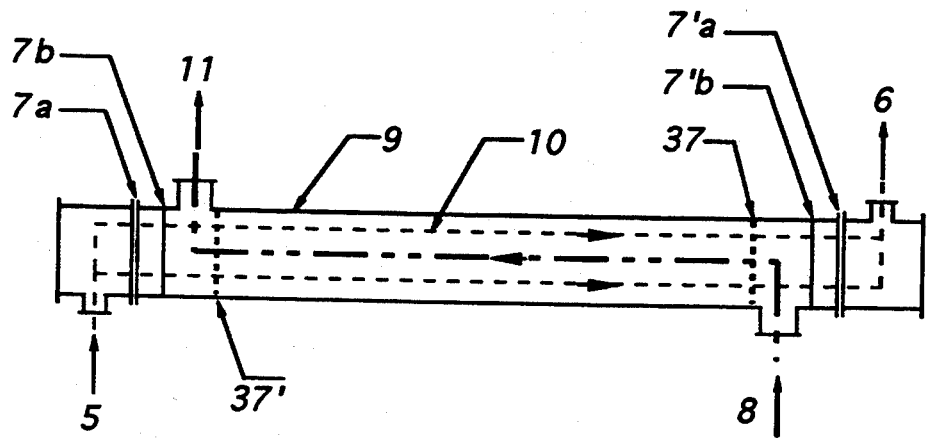
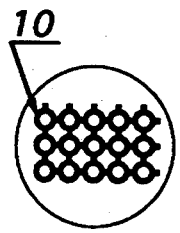 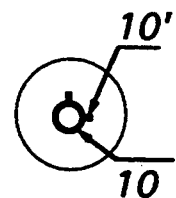
fig. 10a    fig. 10b
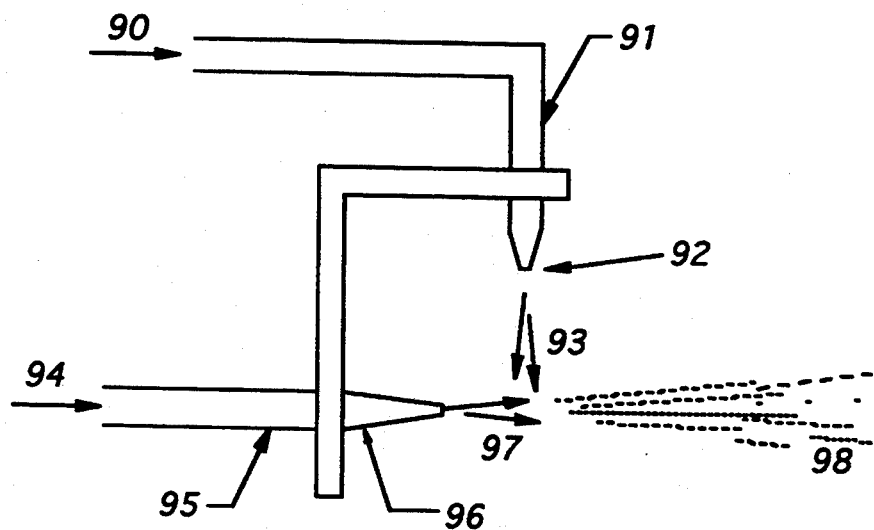
fig. 11

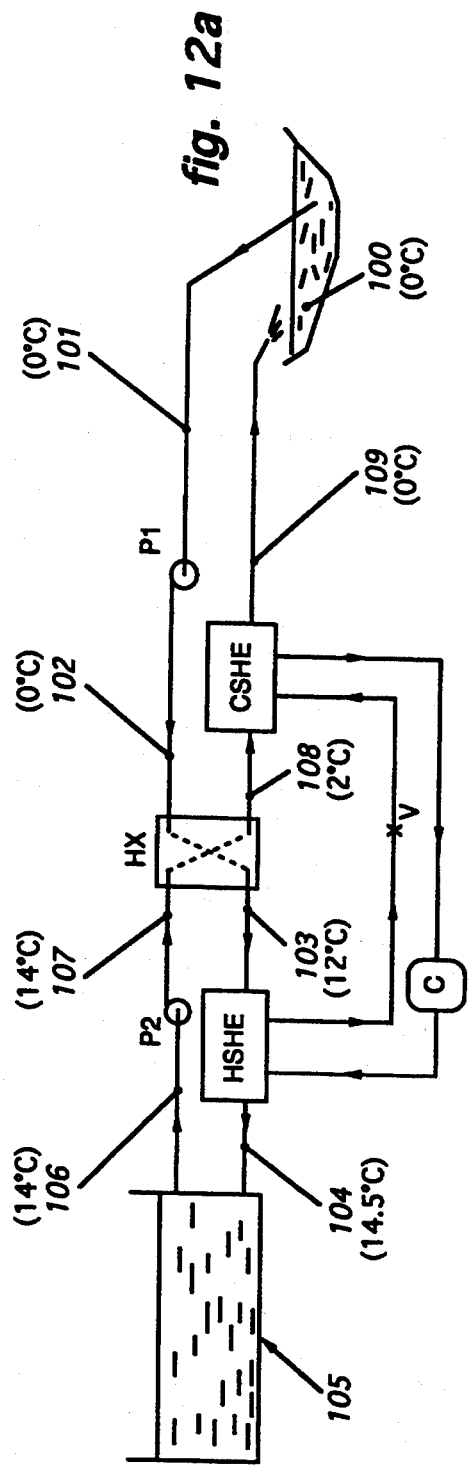
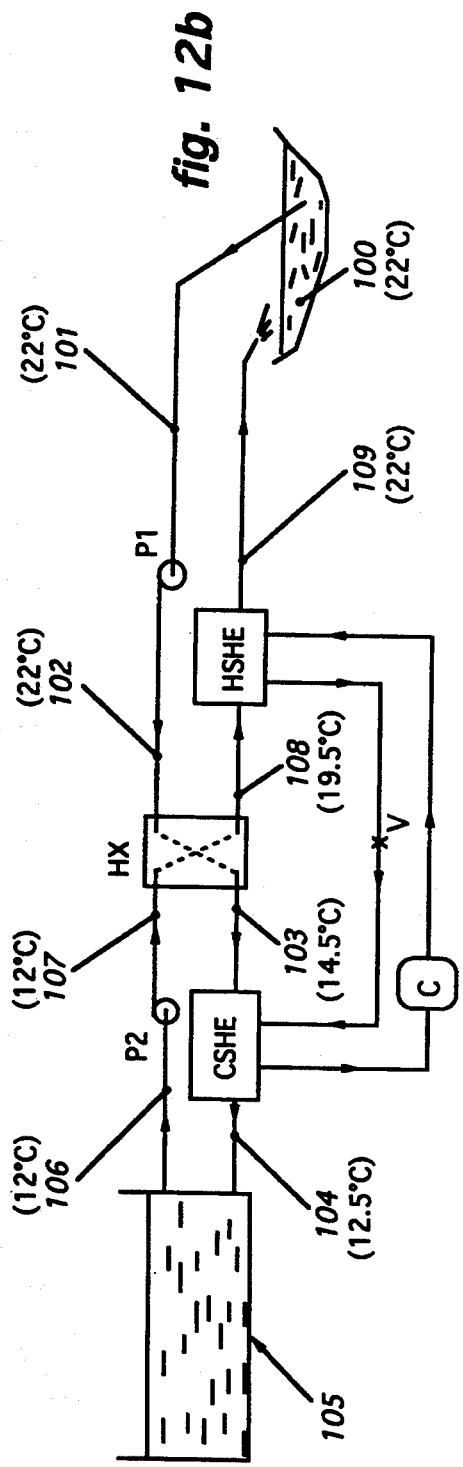

HIGH-EFFICIENCY LIQUID CHILLER

BACKGROUND OF THE INVENTION

This invention relates to a system for cooling any liquid, said cooling being performed for any purpose, including the extraction of energy from said liquid for heating purposes. More particularly, this invention is concerned with a simple and efficient system for generating and handling very cold liquids, down to and below their solid-liquid equilibrium temperature.

A cooler is a component of a liquid-chilling system in which a liquid, usually an aqueous liquid (e.g. water or brine), is cooled by a refrigerant. In a conventional system, the cooling effect comes from the evaporation of said refrigerant. The most common cooler types are: direct expansion and flooded (1990 ASHRAE Handbook: Refrigeration Systems and Applications).

In a typical direct expansion shell-and-tube cooler, the refrigerant evaporates inside tubes, while the fluid to be cooled is channeled throughout the shell by a series of baffles. In a typical flooded shell-and-tube cooler, the fluid, flowing through the tubes, gives its heat to the boiling liquid refrigerant on the shell side. These coolers are usually mounted horizontally. They are normally found in larger systems using screw or centrifugal compressors. In very large diameter shells, the heat transfer at the bottom can be adversely affected by the head of the refrigerant. This problem can be solved by spraying the liquid refrigerant all over the tubes instead of flooding them.

Freezing of the fluid can cause considerable damage to coolers therefore some freeze protection must be provided. Two methods are used. Suction pressure can be held above the one corresponding to the freezing point of the fluid; or the system can be shut down when the fluid temperature gets too close to the freezing point. For pure water, an evaporator-outlet temperature of 5° C. is often considered as a safe lower limit.

Limitations of Present Systems a) The freeze-up problem

If one tries to obtain low fluid temperatures, say 1° C., from a conventional cooler, a freeze-up will occur: the freezing process will start at a location where the wall temperature is well below phase-equilibrium temperature and where the fluid velocity is low. In a flooded type cooler, the flow of water in the tubes does not exhibit any low velocity region; except maybe at the inlet where the flow might be detached for a certain distance inside: a low velocity bubble is then created where freezing might start. The real problem is in the cooler heads, where low-velocity water is exposed to the cold tubesheets. The freezing process will start there if the tubesheet is at a temperature below freezing. In a direct-expansion cooler, several low water velocity regions exist in the shell, which is crossed by cold tubes containing the evaporating refrigerant.

b) The small $\Delta T$ limitation

In a conventional chiller used in air conditioning, the cooler outlet on the fluid side will usually be kept at 7° C. Since the inlet is at about 13° C., a $\Delta T$ (temperature differential) of only 6° C. is thus available for energy absorption. This is an important limitation. If the $\Delta T$ could be doubled (e.g. by using a cooler capable of generating 1° C. fluid outlet temperatures), the system capacity could be doubled without even having to increase the size of the distribution system (pumps, piping and heat exchangers).

c) The constant-temperature phase-change problem

If a high system COP (Coefficient Of Performance) is to be obtained, it is important to have a cycle with the minimum source-sink $\Delta T$: this is possible only with an efficient heat transfer in the hot-side heat exchanger (HSHE) and in the cold-side heat exchanger (CSHE), which supposes a large heat transfer area and small $\Delta T$s in both heat exchangers (HX). The latter condition is quite difficult to obtain in conventional systems. Indeed, if the fluid had to be cooled from 13° C. to 1° C. in a conventional cooler, the refrigerant would have to evaporate at about $-4°$ C. The $\Delta T$ between the entering fluid and the refrigerant would then be about 17° C.: this large value of the $\Delta T$ increases the irreversibility of the heat transfer and causes a significant decrease in the COP of the chilling system.

d) The COP/capacity dilemma

As explained by Didion and Bivens ("The Role of Refrigerant Mixtures as Alternatives". Didion, D. A. and Bivens, D. B. Proceedings, A.S.H.R.A.E. 1989 C.F.C. Conference, Washington, September 1989), when using the usual one-component refrigerants, we have to choose between a large volumetric capacity and a large COP. With non-azeotropic mixtures, on the other hand, we could theoretically get the best of both worlds.

In a previous patent (#EP-A-0 283 528), the applicant presented a method for generating ice slurries from supercooled water. It was then mentioned that in order to be capable of generating supercooled water, the cooler had to comprise small water tubes having a certain geometry, the length-to-diameter ratio being a controlling parameter. The diameter had to be small, because it was thought that multi-pass coolers were in this case impossible.

Here, we are instead dealing with chilling systems capable of cooling, handling and storing any liquid, down to and below their liquid-solid equilibrium temperature. The critical part of such chiller systems are the coolers. Designs are given for coolers capable of performing said liquid cooling. Some designs are only capable of cooling the liquid down to the equilibrium temperature. Other designs can also supercool liquids. The originality here comes from the fact that three ways are given for building liquid coolers in order to render them capable of cooling liquids down to lower temperatures without provoking system freeze-ups. These three ways were not anticipated by the previous patent.

To the applicant's surprise, it has indeed been found that generating and handling supercooled liquids is much easier than it seemed at first. Length-to-diameter ratios of liquid conduit means are not an important parameter; neither is absolute value of diameter (for example, diameters of 22 mm have been tested successfully), neither is pressure, type of flow (laminar or turbulent), exact value of velocity, shape of said conduit means (circular, oval, etc), Reynolds number, smoothness of the inside of the conduit means, rate of heat transfer, etc. Internally-tinned water tubes can even be used. Multi-pass coolers are easy to build: return bends are then used from one water tube to the other. It has been found that return bends having a very small radius of curvature can be used without fear of freeze-up. During the supercooling process, the same heat transfer rules apply as in any standard CSHE: 5 years ago, this simple observation was far from obvious.

SUMMARY OF THE INVENTION

The above described drawbacks can all be eliminated. Indeed, with the invention, complete control over the cooling and freezing processes of liquids is actually obtained.

In one of its aspects, the invention also provides a liquid cooler design in which outlet ends of individual conduit means extensions or outlet ends of main conduit means, from which the supercooled liquid flows, are equipped in such a way as to prevent the formation of ice crystals at said outlet ends, formation of said ice crystals caused by said outlet ends being colder than ambiance; said prevention of crystallization being obtained, for example, by heating said outlet ends, using heat from any source, said heat being transfered to said outlet ends using any of the basic heat transfer modes.

In another of its aspects, the invention provides a new liquid cooler design, said cooler being part of a low-temperature liquid cooling system, said cooler being connected to a liquid supply circuit including one or more conduit means through which said liquid flows, said conduit means passing through and being in contact with a cold medium in said cooler, said cooler being characterized by the presence of double tubesheet(s) at both ends, thus preventing the contact of the said liquid with a cold surface in regions where the said liquid is stagnant or has a low velocity as compared to the average liquid velocity inside the said conduit means passing through said cooler; said cooler also being characterized by the presence of cooler heads at each end, cooler head at the inlet end acting as flow distributor for said liquid arriving through inlet; cooler head at the oulet end acting as flow receiver for said liquid, said liquid then exiting through outlet.

In another of its aspects, the invention provides a new liquid cooler design comprising a set of inner tubesheets and also featuring around each conduit means a larger conduit means, the space between said inner and outer conduit means becoming the conduit means through which said cold medium flows and receives heat from fluid being cooled, the space between new tubesheet and neighbouring tubesheet acting as a distributor for said liquid cooling medium after its entrance into said cooler, the space between new inner tubesheet and neighbouring tubesheet acting as a receiver for said cooling medium, before its departure from said cooler, said cooler thus being converted into a shell-and-multi-double-tube cooler.

In another aspect, the invention also provides a liquid cooler design characterized in the fact that each of said conduit means are extended past exterior tubesheet, the cooled fluid then being fed to a reservoir or anywhere it is needed by each conduit means extension individually; said extensions eliminating low liquid velocity regions near cold surfaces, thus rendering the presence of double tubesheet unnecessary; said cooler thus being transformed into a supercooler.

In another aspect, the invention also provides a liquid cooler design in which the flows from two or more individual conduit means extensions, are instead joined together in order to create a larger flow of supercooled fluid inside a larger conduit means, said joining being rendered possible by making sure that said flows of supercooled liquid between said individual conduit means and said larger conduit means does not have to endure any important mechanical or thermal perturbation; said joining being preferably performed in such a way that the flows exiting from all of said extensions be essentially parrallel, ends of said extensions being possibly pressed one against the other, side-by-side, and introduced into said other larger conduit means or into a special fitting attached to said other larger conduit means.

In another aspect, the invention also provides a liquid cooler design in which said cooler is the CSHE of a heat pump, said heat pump being of the VCHP type, the refrigerant used being of the non-azeotropic-mixture type; said heat pump being further characterized by the presence in the cycle of a reformer LPR, said reformer being a reservoir capable of containing said refrigerant in liquid and vapor phases, said vapor from the top of said reformer (LPR) being entrained, compressed, condensed, and expanded in the hot side portion of the said circuit, said liquid from the bottom part of said reformer (LPR) being entrained, circulated and evaporated in the cold side portion of said heat pump circuit, said circulation in said cold side being produced by a refrigerant pump P, said pump P being capable of producing an overfeeding of said cooler EV, the overfeed rate having any value including one, said pump P having a fixed or a variable speed, said cycle featuring said reformer (LPR) being an improvement over conventional cycles in that the composition of said refrigerant vapor circulating in said hot side is rich in the more volatile, higher density, component(s) of said mixture while the composition of said refrigerant liquid, circulating in said cold side, is rich in the less volatile, higher latent heat, component(s) of said mixture.

In another aspect, the invention also provides a liquid cooler design in which said cooler is part of a low-temperature liquid cooling system in which a continuous flow of supercooled liquid water is changed into a flow of supercooled droplets using any convenient method, said change being a major perturbation, each of said supercooled droplets, because of said perturbation, then rapidly becoming droplets containing a mixture of dendritic ice and water, said ice part in said droplets then growing in ambiant cold air until said droplets become 100% ice crystals (i.e. snowflakes); or said droplets possibly used as seeders for larger cold or supercooled water droplets which will then grow into large snowflakes; said cooling system thus becoming a snow-making machine.

In another aspect, the invention also provides a liquid cooler design in which said cooler is part of a liquid supercooling system, said liquid exiting from said cooler being made to partially change phase, said phase change providing a mixture of solid and cold liquid at the phase-equilibrium temperature; the operating conditions of said system being modulated in order to modify the type of solid material generated during said phase change of said supercooled liquid, said conditions being mainly the temperature of supercooled liquid, a slight supercooling (e.g. at temperatures between 0° C. and about −0,5° C. for pure water) favouring the generation of hard crystals of any size and shape, said shape depending mainly on the way said solid/liquid mixture is handled; a "deep" supercooling (e.g. at temperatures below about −1,2° C. for pure water) tending to generate fine crystals (24); a medium supercooling (e.g. at temperatures between about −0,6° C. and about −1° C. for pure water) tending to generate medium size crystals.

In another aspect, the invention also provides a liquid cooler design in which said cooler is the CSHE of a heat pump, said heat pump being of the hybrid-cascade type, comprising one (or more) absorption heat pump AHP, said system also using one (or more) vapor-compression heat pump VCHP, said AHP being normally unable to attain the low temperature necessary for providing desired final liquid states, said AHP being helped here by VCHP installed in cascade fashion with said AHP; the CSHE of said VCHP being capable of cooling the liquid exiting from AHP down to low temperatures, the capacity of AHP being large enough to provide chilled liquid both for HSHE of VCHP and for CSHE(s) of VCHP; said low temperature liquid being sent to load and coming out as warmed liquid; the cooling liquid coming out of said HSHE as a warm liquid; warm liquids flows being joined into a larger flow of warm liquid which is sent back into the CSHE of the AHP for chilling purposes; this method of generating deeply cooled or supercooled liquids being characterized by the fact that the system, while remaining essentially an absorption system, permits the use, as components, of AHPs which are unable by themselves of deeply cooling liquids.

In still another aspect, the invention provides a method of generating ice with a liquid cooler, said cooler possibly being the CSHE of a liquid chiller, said chiller being capable of cooling any liquid; said liquid being cooled by said cooler to supercooling temperatures; said exiting supercooled liquid being made to partially change phase; said phase change providing a mixture of solid and cold liquid at the phase-equilibrium temperature. Of the numerous possible uses for such mixtures, one is the manufacture of snow from a solid-liquid water mixture, said solid part being separated from said mixture; said resulting solid part being high-quality snow, said snow thus being manufactured independently of atmospheric conditions.

In another aspect, the invention also provides a liquid cooler design in which said cooler is part of a freeze-concentration system where a slightly supercooled liquid is forced through a porous membrane, solid and porous ice then starting to build up all over said membrane, said membrane then acting as a crystallizer, said method providing a way of separating solids from liquids.

In another aspect, the invention also provides a liquid cooler design in which said cooler is part of a liquid supercooling system where a continuous flow of supercooled liquid water is brought to a reservoir where it is changed into a mixture of ice crystals and water, said cristals slowly accumulating inside said reservoir, the mixture being kept homogeneous and in constant motion with the help of mixers of any type, including "eggbeaters", in such a way that crystal agglomerations are continuously broken-up, the resulting slurry, when needed, then being capable of easily flowing towards outlet of said reservoir and entering conduit means and then being pumped towards some other location, e.g. a reservoir in another building.

In another aspect, the invention also provides a new cooler design in which said cooler is part of a liquid conditioning system, said system being used for heating liquids initially at or near their solid-liquid equilibrium temperature; said heating being performed using very little outside energy; said heating being performed using thermal energy still present in rejected liquid; said rejected liquid being still warm; most of said heating being performed in a passive way using a liquid-liquid HX; said heating also being partly performed by the HSHE of a heat pump; said heat pump also having a CSHE, said CSHE being capable, when necessary, to supercool said rejected liquid.

BRIEF DESCRIPTION OF THE DRAWINGS

Preferred embodiments of the present invention will now be described and schematic drawings presented. Unless otherwise noted, it will be assumed here, for the sake of simplicity, that the type of heat pump cycle used is of the VCHP type. FIGS. 1 and 2 show, respectively, schematic diagrams of one-pass and two-pass flooded shell-and-tube coolers based on the present invention. FIGS. 3, 4a, 4b, 4c, 5a, 5b, 5c and 6 show several alternative designs also based on the present invention. FIG. 4d shows an ice-slurry outlet design, suitable for removing an ice slurry from a crystallization reservoir. FIG. 5'a shows a tube-outlet design suitable for tubes carrying supercooled-liquid flows, based on the present invention. FIGS. 8 and 10 show true counterflow coolers based on the present invention and capable of using, to the fullest, the non-azeotropic refrigerant mixtures. FIGS. 10a and 10b show construction details of the liquid tubes used inside the cooler shown in FIG. 10. FIG. 11 shows a simplified atomizer for supercooled liquids, the probable main application being the generation of "artificial" snow. FIGS. 12a and 12b show a heat-pump arrangement permitting a very efficient conditioning of water, one application being in fish aquaculture installations.

DESCRIPTION OF THE INVENTION

Figure 1A:
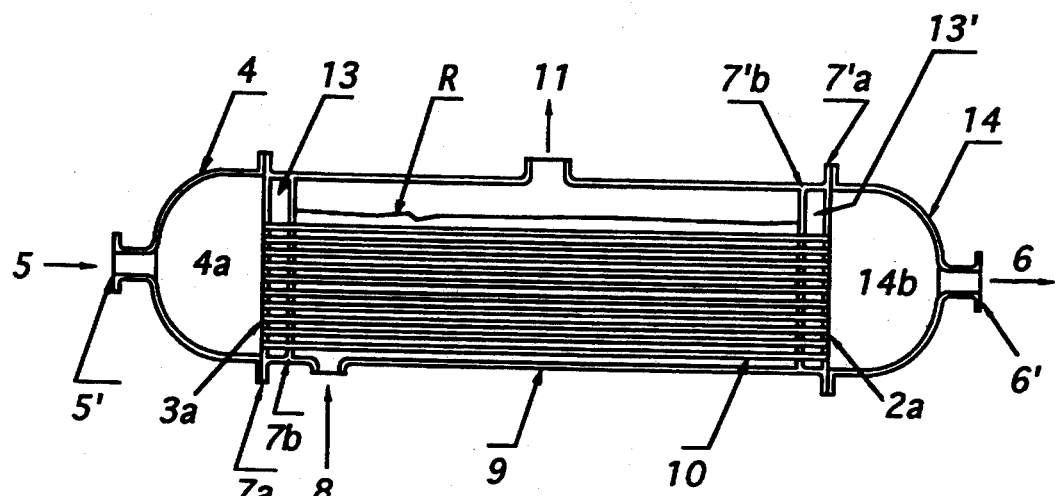
FIGS. 1a and 1b show, respectively, inlet and outlet ends of water tubes inside a one-pass cooler.

The invention provides simple methods of yielding very cold liquid flows, down to temperatures heretofore impossible to attain with any machine. It also proposes improved thermodynamic cycles permitting attaining these low temperatures in a very efficient manner.

a) A low temperature cooler

The freeze-up problem described above can be solved by first modifying the liquid coolers to make them practically freeze-proof. The concept applies to most types of coolers. We will first take as an example the case of the flooded shell-and-tube cooler featuring conventional circular cross-section fluid tubes. Other types of coolers will be discussed later. FIG. 1 shows a modified flooded cooler (9) designed according to the present invention. It features double tubesheets (7a, 7b and 7'a, 7'b), the spaces (13, 13') between the latter being filled with insulation, e.g. polyurethane foam, air, etc. The width of that space (13, 13') should be sufficient to provide a good heat barrier, e.g. about 10 to 20 tube diameters (O.D.), or more in special cases. Said spaces (13, 13') can also be partly or fully open to atmosphere. The improvement here is that the low-velocity liquid in the cooler heads (4), (14), is nowhere in contact with a cold surface (7b, 7'b). Alternate designs will be shown later where the low liquid velocity regions (4a,14b) and/or the cold surfaces themselves are simply eliminated.

Preventing the cold medium (e.g. refrigerant R) from getting into the spaces (13, 13') between the tubesheets (7a, 7b and 7'a, 7'b) is easy; for example by expanding the tube (10) diameter into said tubesheets by means of an expander. Many expansion methods are available (see "Heat Exchangers; Selection, Design and construction", a book by E. A. D. Saunders; John Wiley and Sons, New York).

Figure 1A:
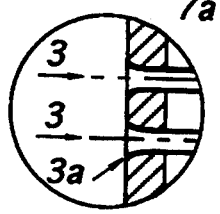
Figure 1B:
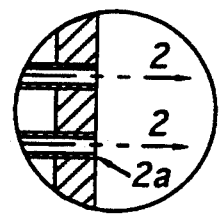

Another minor modification that will improve considerably on the cooler's reliability, is a smooth entrance (3a) at the inlet end of the fluid tubes (10), as shown in FIG. 1a. This:

will decrease the pressure drop on the fluid side will prevent gradual erosion of the tubes at the inlet end (3a)

will further reduce the chances of freezing inside the tubes (10).

The last statement can be explained by the fact that a detached flow at the abrupt entrance to a conduit means (10) creates a "bubble" of reduced velocity where fluid freezing could possibly start. Preventing erosion is also important because said erosion can cause surface pitting, thus creating minute pockets of stagnant liquid which might start the freeze-up process.

Figure 2A:
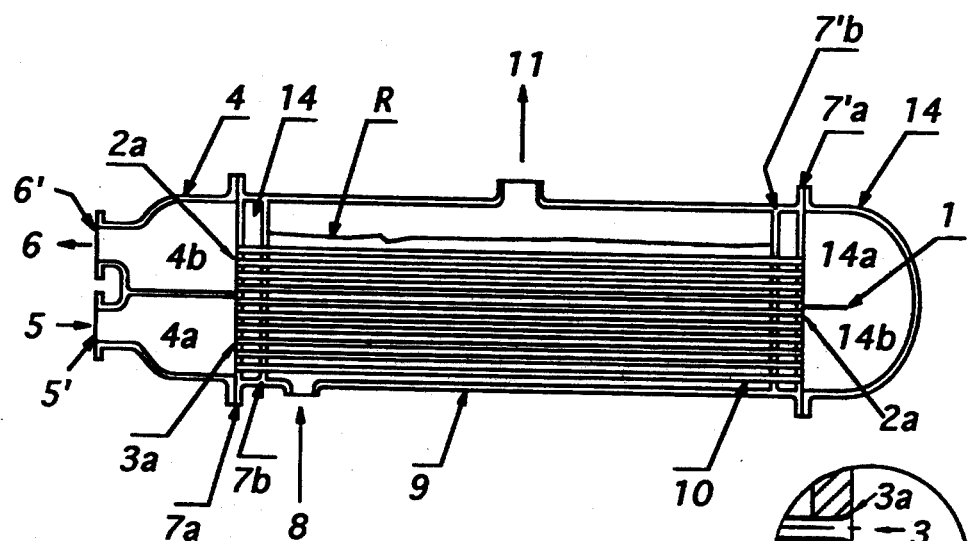
FIG. 2a shows inlet and outlet ends of water tubes inside a two-pass cooler.
Figure 2A:
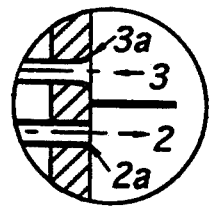

FIG. 2 shows another cooler (9) designed according to the present invention. It features two tubeside passes (that is, the fluid goes twice through the shell, e.g. once from left to right, in the lower part of the shell, and back from right to left in the higher part), which reduce the length of said cooler (9) for a given fluid temperature difference between inlet (5) and outlet (6). It also features the above described double tubesheets and smooth fluid-tube inlets (3a), (FIG. 2a). An optional baffle (1) is also added for separating the outlet (2) and inlet (3) flows, said baffle extending far enough inside the cooler right-hand head (14) to effectively prevent one fluid flow (2) from disrupting the other (3). A baffle length equivalent to about 10 tube diameters should be sufficient.

Figure 3:
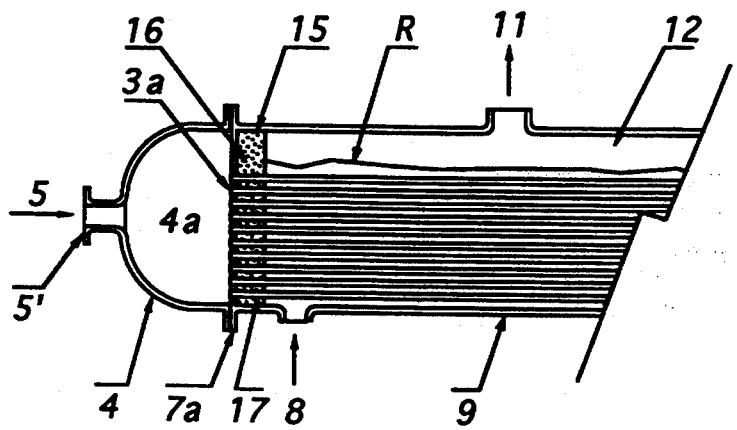

One could obviously think of many other ways of creating a thermal barrier between the cold medium and the liquid to be cooled. Instead of installing a second tubesheet (7b), one could, for example, install a piece of rigid or semirigid insulating material (16) between the cold medium (R) and the tubesheet (7a) (FIG. 3). Expansion of the tubes (10) into the insulator (16) and the installation of 0-rings (15) between the insulator (16) and the shell (9) would prevent the cold medium (R) from leaking to the tubesheets (7a). The insulating material (16) could also be installed on the liquid side of the tubesheets, i.e. between the liquid to be cooled and the tubesheet (7a), thus eliminating the cold surface itself One could also add extensions (20) to the conduit means (10) and even eliminate the cooler head (14) at the exit end (FIG. 4a), or even at both ends, if desired (FIG. 4b), thus eliminating all the low fluid velocity regions close to the tubesheets (7a,7'a): in this case the inner tubesheets (7b, 7'b) would become superfluous.

Instead of being passively warmed up by means of insulation (16 or 13), tubesheet (7a) could also be actively heated in some way. Although this active heating normally would not be done, it is possible to imagine instances in which it could become desirable, thermodynamically speaking. For example, in a VCHP system, subcooling of the liquid refrigerant from condenser, before its entrance into the expansion device, provides improved cycle efficiency. Said subcooling could be performed by sending said liquid refrigerant into the space (13) between tubesheets (7a, 7b). Care should be taken as the final temperature of said subcooled liquid refrigerant should not fall below entering-liquid (5) temperature. This might necessitate the presence of some thermal insulation on the surface of tubesheet (7b), preferably within space (13). Said subcooling within space (13) would save the cost of a refrigerant-to-refrigerant HX. Of course, said subcooling could be performed just as well within space 13'. Many other methods of actively protecting the stagnant liquid inside cooler head (4a) from freezing could be imagined.

Figure 4A:
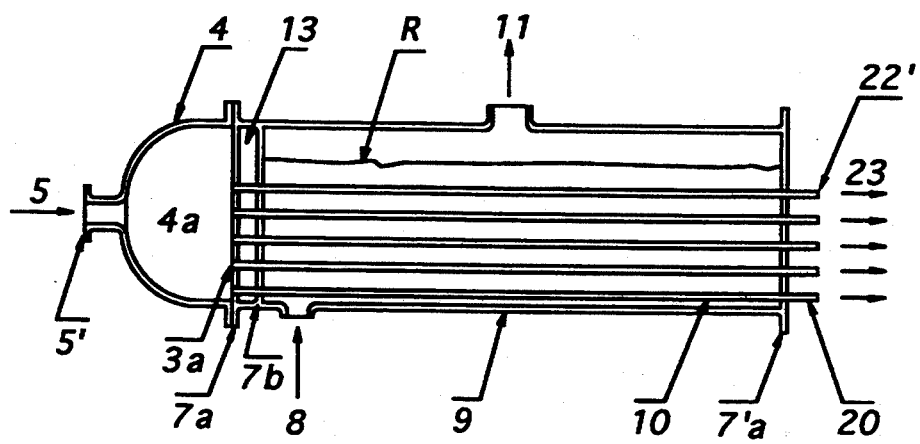

When fed with a liquid at 3° C., a cooler (9) like the one in FIG. 4a, having the proper length and the proper coolant-to-liquid $\Delta T$, will give an outlet temperature of 0° C. When fed with a liquid at 0° C. instead, other things being equal, the same cooler (9) would have the capability of providing an outlet temperature of about $-3°$ C. If the liquid were pure water, that outlet temperature would correspond to a supercooled state. A liquid is said to be supercooled if it is at a temperature well below the phase-equilibrium temperature while still in the liquid phase. The supercooled state is a metastable state. In such a state, a substance has a certain phase stability; but if disturbed, it will try to acquire a greater stability, i.e. it will try to go up in temperature (up to the phase equilibrium temperature, e.g. 0° C. for pure water) by partially changing phase. For a metastable flow to continue to exist, sources of perturbations (mechanical, thermal, etc.) must be eliminated or at least significantly reduced.

Figure 4B:
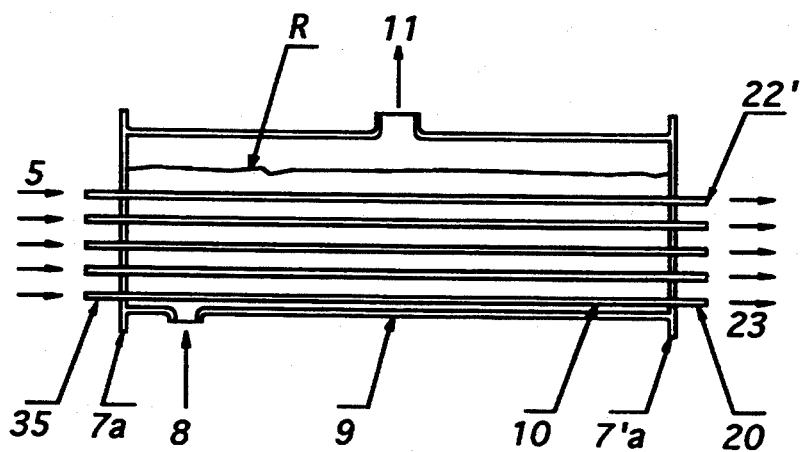

Looking at FIGS. 4a and 4b, it is seen that such designs are capable of generating supercooled liquids; indeed, the liquid (23) at the outlets is not subjected to any perturbation (abrupt changes in direction, etc.) and no stagnant or low velocity regions exist near to a cold surface (7'a). In FIG. 4a, the liquid will not have a tendency to freeze near the inlet because the tubesheet (7a) is not cold, being protected by a thermal barrier (13). In FIG. 4b, the liquid will not have a tendency to freeze near the inlet either because the liquid flow (5) does not exhibit any stagnant region near a cold surface (7a). Supercooled liquid (23) out of extensions (20) can be discharged directly into some reservoir (26) or large body of water. Extensions (20) of conduit means (10) can be of any length.

Figures 4C, 4D:
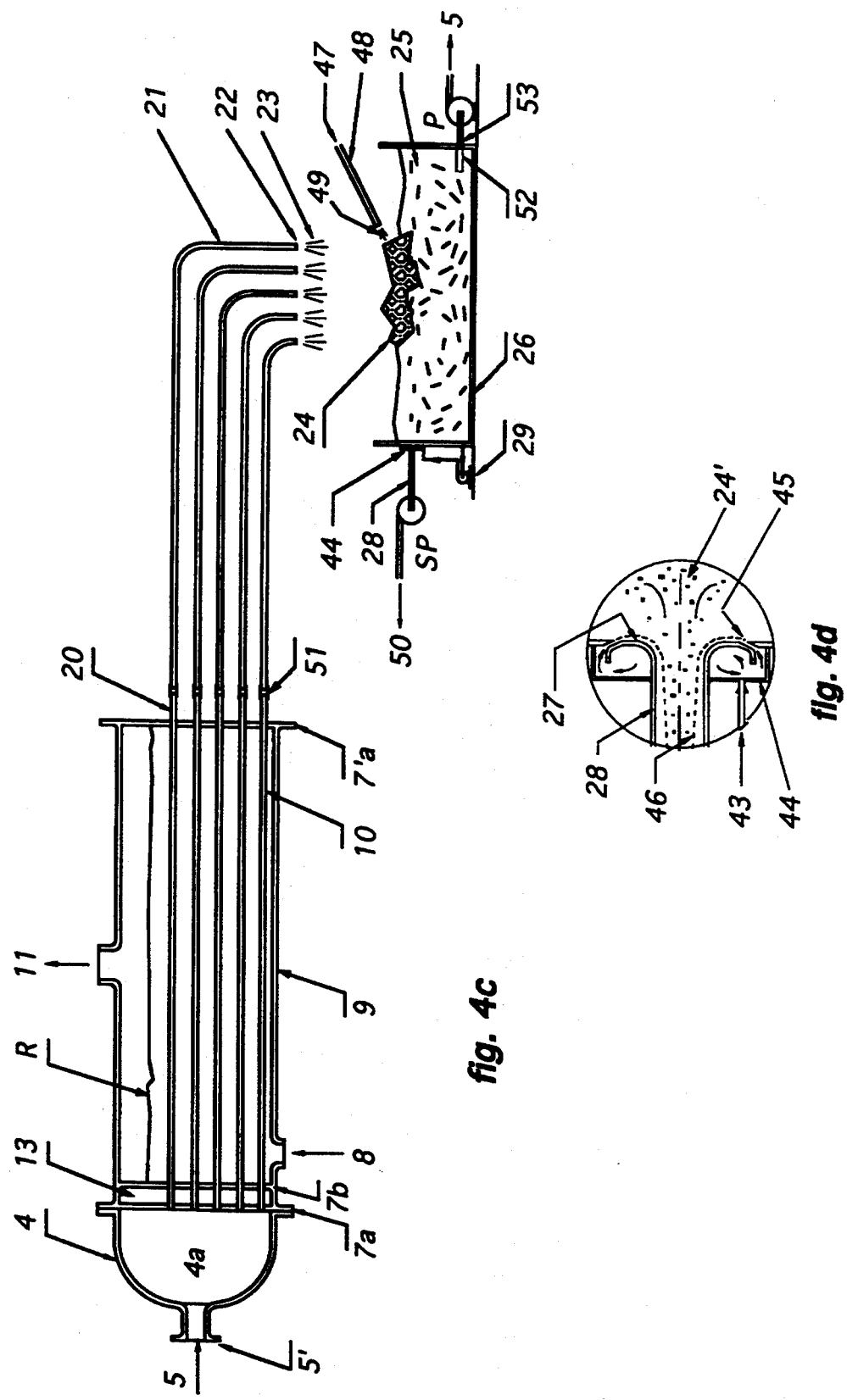

When fitted with longer conduit extensions (21), cooler (9) will also be capable of delivering said supercooled liquids to a nearby (or remote) reservoir (26) (FIG. 4c). Said extensions (21) can be of any length and made out of any convenient material, including plastic. Connection (51) between said extension (21) and said extended fluid tube (20) can be of any type, including using soft-plastic unions, e.g. press-fitted in place.

Note that the liquid (5) entering individual tubes in FIG. 4b will normally come from a distribution chamber located at some distance upstream, said chamber being in any convenient position (e.g. above) relative to shell (9). Said chamber thus replaces the inlet head (4) of cooler (9), being in effect a cooler head (4) separated from shell (9) by a large space (13), said space being completely open to atmosphere.

Note also that the reservoir (26) does not have to be open to atmosphere: the system will work just as well, for example, with reservoir (26) under high inert gas pressure. It should be stressed also that supercooled liquids can be stored in a reservoir (26) almost as easily as any conventional liquid, the only condition being a careful handling (minimum of perturbations). That can be done, for example, by guiding jet(s) of supercooled liquids so that it hits container walls at an angle much smaller than 90° (preferably 30° or less). It is also possible to deliver supercooled liquids to a reservoir through an inlet located below liquid surface. Instead of being stored, supercooled liquids can also be delivered to locations far from the cooler (9), provided said liquids are handled according to the principles given in the present invention.

It should be noted that, contrary to what was previously thought by the inventor, flows of supercooled liquids inside conduit means can tolerate a certain degree of large scale turbulence; indeed, tests with flows of water inside a tube have shown that increasing abruptly said tube diameter by a factor of 3 (and decreasing it as abruptly a few cm further downstream) did not normally provoke a freeze-up in the line. The problem is that it sometimes did! Small changes in diameter never were a problem, however; neither were connections made using different materials. For example, connecting a plastic tube extension onto a metal tube, downstream of the cooler, never provoked a freeze-up, at least not under normal operating conditions.

It should be noted also that very high rates of heat transfer can be used in a supercooling CSHE. For example, rates as high as 45 kW per square meter of (internal) heat exchange area have been used successfully with (internally and externally) smooth tubes. Tube-wall temperatures below −7° C. were obtained in these cases. Using tubes that are tinned on the refrigerant side, higher values of said rate might even be possible. These heat rate values are higher than what is normally used in the refrigeration industry. This permits the use, when necessary, of very short fluid tubes (10) (i.e. having low values of L/d).

The design shown in FIG. 1 is not capable of generating supercooled liquids in a reliable manner: the liquid (2) flowing in the outlet head (14) is subjected to too many perturbations (abrupt changes in directions, in speed, in flow cross-sections, etc.). It has been found, however, that increasing the length of the head (i.e. effectively increasing the distance between outlet (6′) and tubesheet (7′a) improved the situation somewhat. With the design shown in FIG. 2, it is possible to obtain limited supercooling at the exit, again with limited reliability.

The designs of FIGS. 1 and 2 can easily be modified for reliable supercooling operation, however. For example, FIG. 5a shows one of several possible designs for a one-tubeside-pass cooler capable of generating supercooled liquids: connectors (31) are used to connect the tube extensions (20), inside the cooler head (14), to the main conduit means (33). Depending on the material used for making said connectors (e.g. metal or plastic) said connectors (31) can be joined in different ways. For example, they can be glued or soldered to one another, side by side, and press fitted inside an extension (32) of the head (14). Said head (14) could be made in 2 parts one of which could be removed for inspection. Of course, one can think of an infinite number of variations of the same theme, the fundamental idea being simply to eliminate low velocity regions near cold surfaces (e.g. internal tubesheets) and to provide smooth flow inside the cooler (9), between said cooler (9) and main conduit means (33), and also inside said main conduit means (33), large scale turbulence being reduced to a minimum. FIG. 5b shows a 3-tubeside-pass cooler designed according to the present invention, perfectly smooth flow being maintained between inlet (5′) and outlet (32) of said cooler (9). It should stressed that the 180° elbows (34) in FIG. 5b could be located inside the shell (9), if desired, instead of inside the heads (4, 14): this, however, would prevent easy cleaning of the inside of conduit means (10). It should also be mentioned that said 180° elbows (34) can exhibit relatively sharp turning radiuses. For example, mean radiuses as small as 0,7 times the tube outside diameter have been used successfully.

One might also want a chiller capable of cooling a liquid down to (or close to) its phase equilibrium temperature, using a one-pass or a multi-pass cooler, while still keeping its options open as to the possibility of generating supercooled liquids at a later date. For example, FIG. 5c shows a liquid cooler that can easily be transformed into a liquid "supercooler" of the type shown in FIG. 5a, said transformation being obtained by the addition of extensions (connectors) (31) to individual liquid conduit-means (20), said extensions (31) then permitting the creation of a large flow in a large conduit means (33). It is also possible to transform the cooler of FIG. 5c into the "supercooler" of FIG. 4c by the addition of individual extensions (21) and by the removal of the head (14).

Once generated and sent through a line (33) of some sort, a supercooled liquid must still be handled with special care. Major perturbations must be eliminated from said line; particularly the presence of ice crystals at any point in the flow. Even solid particles that might resemble ice crystals should ideally be eliminated from the flow, for example by filtering the liquid at a location upstream of the cooler (9). The presence of ice crystals must be prevented especially at the final outlet ends (22′, 22, 36), where the flow leaves the conduit means (20 or 21 or 33) and enters the ambiance (said ambiance being any space having a characteristic dimension sensibly larger than that of said conduit means, said space containing any liquid, vapor or gaz). Said outlet ends or tips (22, 22, 36) are sometimes in a very humid atmosphere, for example in the space above the liquid level inside a reservoir (26). Said outlet ends or tips (22, 22, 36) also tend to be very cold, at about the same temperature as the supercooled liquid. Humidity will thus condense on said cold tips. Being at a temperature below phase equilibrium temperature, the condensed humidity will eventually freeze and ice crystals will touch the flow of supercooled water (23). Ice will then rapidly accumulate on said tips, thus preventing the liquid from flowing. This in turn will provoke freezing inside the conduit means (10).

The problem can be solved by preventing the freezing of said condensation on said tips (22′, 22, 36), or by preventing said condensation itself. There are many ways of doing this. For example, constructing said tips using certain materials like urethanes helps a lot. Depositing on said tips an anti-fogging material can also prevent condensation. Another method is simply the local heating of the surfaces of said tips. Said heating can be done by any of the known heating means, using conduction and/or convection and/or radiation as the basic heat-transfer methods. Local surface heating using resistive paper or conductive paints as a heating element is a possibility. Using chemical (exothermic) paints is another. Circulation of a warm liquid in a small conduit means (36′) at or near the tip (36) of the main conduit means (33) is another possibility (FIG. 5a). Simply heating said tips with a flow of warm room air using a small fan was also found to be effective in the case when the reservoir is open to atmosphere. Many other methods could be imagined.

Very little heating is needed in practice, since the area involved is small and since the ΔT is also small. Indeed, for preventing said condensation from freezing, the local surface temperature has only to be kept above the phase change temperature of the liquid. For preventing said condensation from occurring at all, the surface temperature would have to be kept above the local dew point; this would imply more intense heating than in the previous case. Any liquid droplet splashed onto or near the cold tip (22', 22, 36) of the conduit means (20, 21, 33) will have the same disastrous effect on the flow of supercooled liquid: said droplets will freeze on said tips, eventually provoking blockage of said conduit means. The problem can be solved in the same way as above (e.g. with localized heating).

Local freezing and blockage at the tips (22', 22, 36) can also occur if said tips are located below liquid level of a reservoir (26) or large body of water. Being at a temperature below phase equilibrium temperature, said tips will tend to induce the formation of ice at the very tips of the outlet ends. Localized heating can be used here also, but in this case, more power will be needed. Warm liquid circulation at said tips, inside a small-diameter conduit means (36') is a valuable option (FIG. 5'a). It has also been found that making said tips out of an insulating material (e.g. plastic) and/or keeping ambiant liquid moving relative to said tips (convection) helped in preventing freeze-up. Outlet designs favoring ambiant liquid entrainment (convection) will also work well.

Figure 6A:
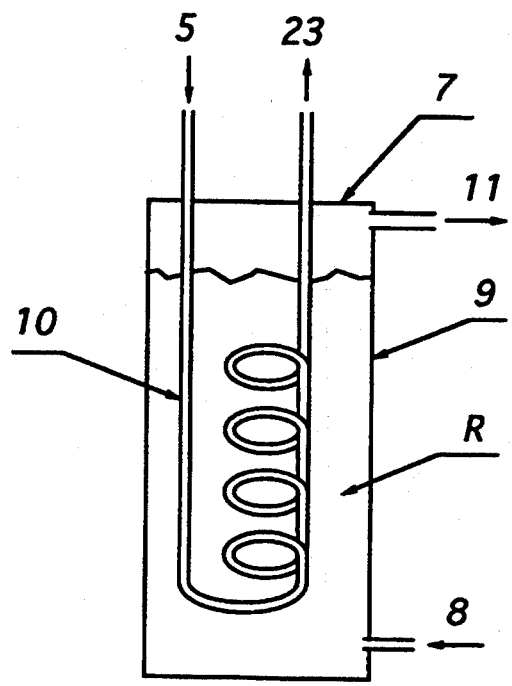
Figure 6B:
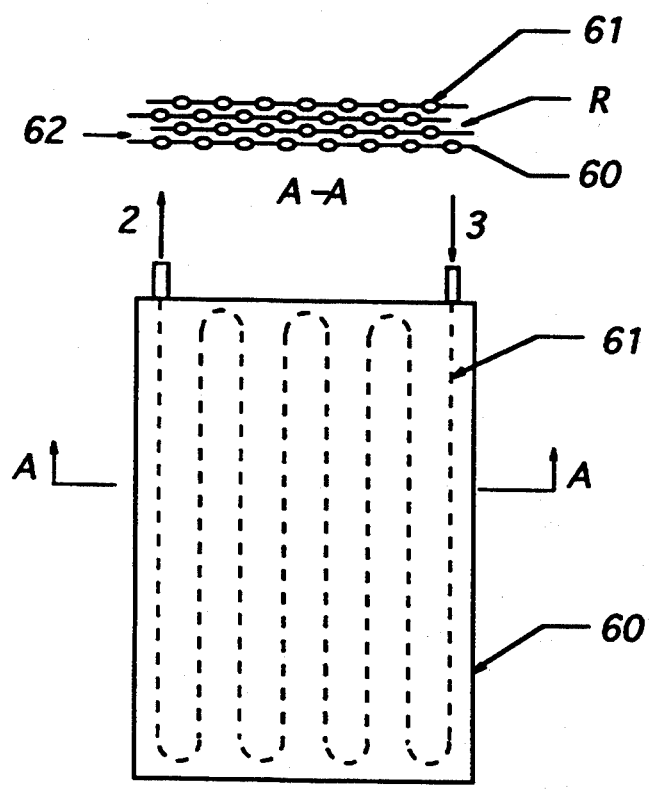
Figure 8:
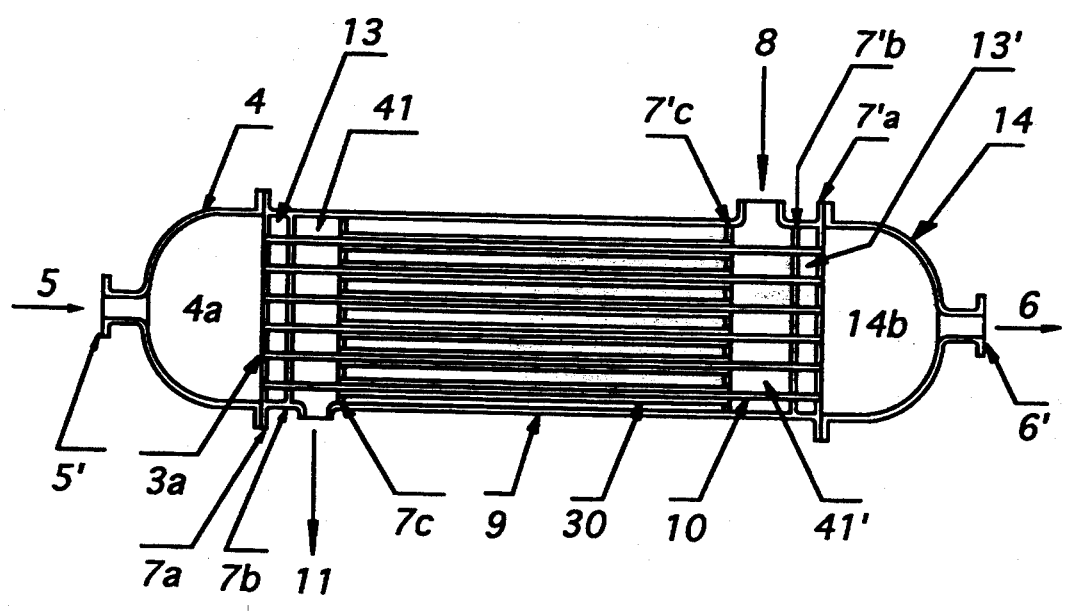

The modifications described here were applied to flooded shell-and-tube coolers (9). As mentioned earlier, the invention applies also to most other types of coolers. For example, FIGS. 6, 8 and 10 show some of the numerous possibilities. FIG. 6a shows a coil-in-shell type cooler where the cold medium (R) is inside the shell (9) and the liquid (5) being cooled circulates in the coiled conduit means (10), the top of said shell (9) acting as the tubesheet (7) for said coiled conduit means (10). FIG. 6b shows an element (60) of a plate type cooler featuring internal channels (61). Both types (FIG. 6a, 6b) can be designed to cool liquids down to and below the freezing point if the fundamental concepts explained above are applied. In both cases, regions of low velocities near cold surfaces have simply been eliminated. In the latter case, the plates (e.g. roll-bonded aluminium) could be stacked-up, the space (62) between plates (60) being used for the circulation of the cold medium, the individual flows (2) of cold liquid merging in a manifold designed according to the present invention. By properly directing the fluid and the cold medium flows (in a fashion similar to what is done in the case of shell-and-tube coolers), it is possible to design plate-type coolers capable of countercurrent heat exchange. Other designs of plate-type HX capable of supercooling liquid are possible.

b) A large ΔT chilling system

One of the above-mentioned limitations of the present systems, namely the freeze-up problem, can thus be solved, as we have just seen. Let us now explain how the other 3 limitations can also be eliminated. To simplify the explanations, let us first continue using the simple case of the VCHP chiller. It has been shown above that with a conventional one-component refrigerant, the constant-temperature phase change eliminates the possibility of getting a large fluid-side ΔT (e.g. from 13° C. to 0° C.) inside a single shell (9) while keeping a high system COP. There are at least three solutions to this problem. Two will make use of multiple subsystems in series; the other ones will use another type of refrigerant, the non-azeotropic mixture, and will feature improved thermodynamic cycles.

Multiple cooler systems

An example of such a system would be composed of 4 subsystems of equal capacities installed in series, each one being capable of cooling the liquid by about 3° C., this small fluid ΔT across each cooler helping in maintaining good efficiency. The fluid would enter the lead subsystem at about 12° C., go through each subsystem, one after the other, and leave the lag unit at about 0° C. The condenser water would enter the lag unit at, say, 26° C., in turn go through each condenser, and leave the lead unit at 38° C. Since the ΔT between the fluid and the refrigerant would be uniformly small, in the CSHE as well as in the HSHE, the overall heat-transfer efficiency would be good and the system COP would be nearer its theoretical maximum. The arrangement would also have the advantage that in case of a decrease in the load, one or more of the subsystems could be shut down.

The same type of arrangement could theoretically be used with other types of heat pumps, for example the absorption heat pump (AHP) or the chemical heat pump (CHP). The problem here, however, is that large AHPs or CHPs capable of providing low temperature liquids (e.g. 0° C. water, or ice slurries) are not available on the market and will probably not be for many years to come. The large machines that are normally available use the pair $H_2O$-LiBr and can only provide water at a minimum of approximately 6° C.

Figure 7A:
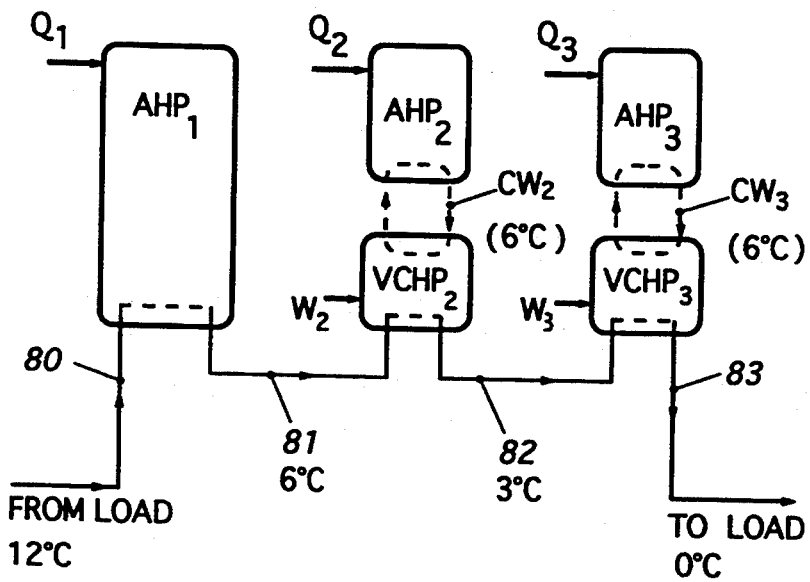
FIGS. 7, 9a, 9b, 9c and 9d show schematic diagrams of improved refrigeration cycles permitting an efficient generation of very cold liquid flows.
Figure 7B:
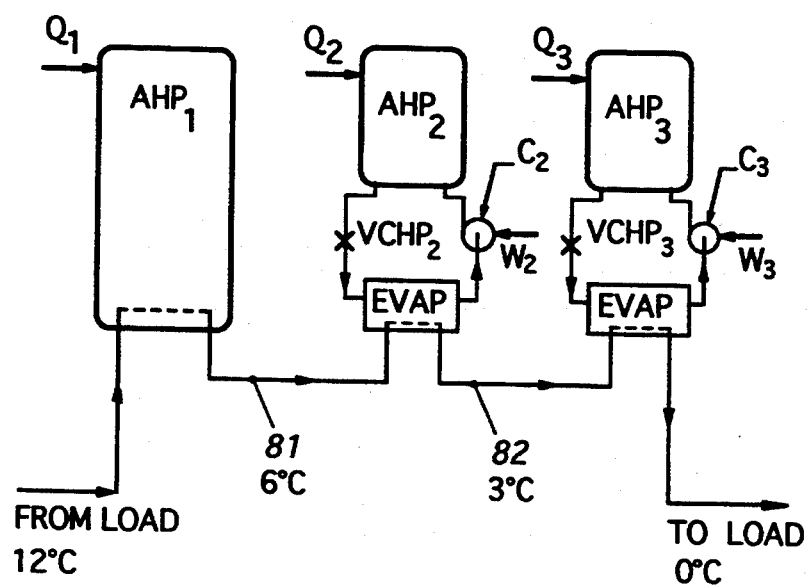

Since there is a need for such low-temperature systems in the 0,1 to 30 MW capacity range, especially in space-cooling applications, the following arrangement is suggested. FIG. 7a shows an example of what we could call a hybrid multiple-cascade system, capable of generating very cold liquids (e.g. 0° C. water) or supercooled liquids efficiently if large quantities of cheap, low-grade heat are available. An infinity of arrangements is possible. The important feature here is the fact that one (or more) AHP be arranged in series fashion (along the liquid circuit) with one (or more) VCHP, in order to bring, in two or more steps, the liquid temperature down to its desired low final value. In such a system, as shown in FIGS. 7a to 7d, one (or more) AHP (or CHP) is also coupled in cascade fashion with one (or more) VCHP heat pump.

Let us take an example: here is how a hypothetical hybrid water-chilling system for space cooling might work. $AHP_1$, with a capacity of 4 MW (about 1100 tons) is capable of bringing the 12° C. water (80), coming from load, down to 6° C. (81). The cascade subsystem $AHP_2/VCHP_2$ (2 MW capacity) is installed in series (in the liquid circuit) with $AHP_1$ in order to bring water (81) from 6° C. to 3° C. (82). By itself, $AHP_2$ would not be capable of bringing the water (81) temperature down from 6° C. to 3° C. It is merely used here as a source of cooling water ($CW_2$) at about 6° C. for the condenser of $VCHP_2$. In a similar fashion, $VCHP_3$ (2 MW), is capable, with the help of $AHP_3$ (about 2,2 MW) as a source of cooling water ($CW_3$), of bringing the water (82) to its final temperature of 0° C. (83).

The advantage of this arrangement is the fact that most of the power (about 96%) for cooling the load still comes from low grade heat sources ($Q_1$, $Q_2$, $Q_3$). Some mechanical power ($W_2$, $W_3$) is necessary to drive the compressors of the VCHPs. But the quantities involved are very small (about 3% of total incoming energy). The other 1% is used to drive the pumps of the AHPs. Indeed, in this case, said VCHPs have a very high COP since they are optimized to work between fixed (or almost fixed) source and sink temperatures, said temperatures being very close to one another (about 6° C. apart, here). Said COPs are calculated to be around 12, if all the components, as well as the refrigerant, are well chosen. In this example, the overall system capacity is 8 MW. The sources of power could be: about 12 MW of low grade heat, and about 0,5 MW of mechanical power, assuming a typical COP of 0,75 for the AHPs. Of course, this mechanical power does not have to be provided by an electric motor; a diesel engine (or any convenient driver) could be used, the fuel being oil, natural gas or any other convenient fuel.

Several strategies could be imagined for operating the system at part load conditions, the large number of subsystems in this arrangement offering all the flexibility needed. For example, one could choose to operate the VCHPs at full load all the time, the variations in load being taken over completely by $AHP_1$; this would save the cost of a variable speed drive on the motors and improve on the overall COP.

Of course, many variations of the above arrangement are possible. For example, (FIG. 7b) the evaporator of $AHP_2$ could be used directly as the condenser of $VCHP_2$: the refrigerant in the $VCHP_2$ circuit would then condense, in indirect contact with the refrigerant evaporating in $AHP_2$. Same thing for $AHP_3$ and $VCHP_3$. Two HX would thus be saved and the COP of the system would be even greater than in the above described case.

One could even go a few steps further and keep only one AHP and one VCHP (FIG. 7c), the chilled water out of the larger AHP providing all the water needed by the smaller VCHP: the condenser cooling water (entering at 6° C. and leaving at 12° C.) as well as the cooler water (entering at 6° C. and leaving at 0° C.). Warm water from load (at 12° C.) and condenser cooling water (also at 12° C.) would join and both go back to the inlet of the AHP to be chilled again. Such an arrangement still features the original idea of a VCHP in cascade with a AHP, but has a much smaller number of components. It would thus be cheaper but would also be somewhat less versatile than the previous versions, considering the reduced number of possible part-load control strategies.

Figure 7C:
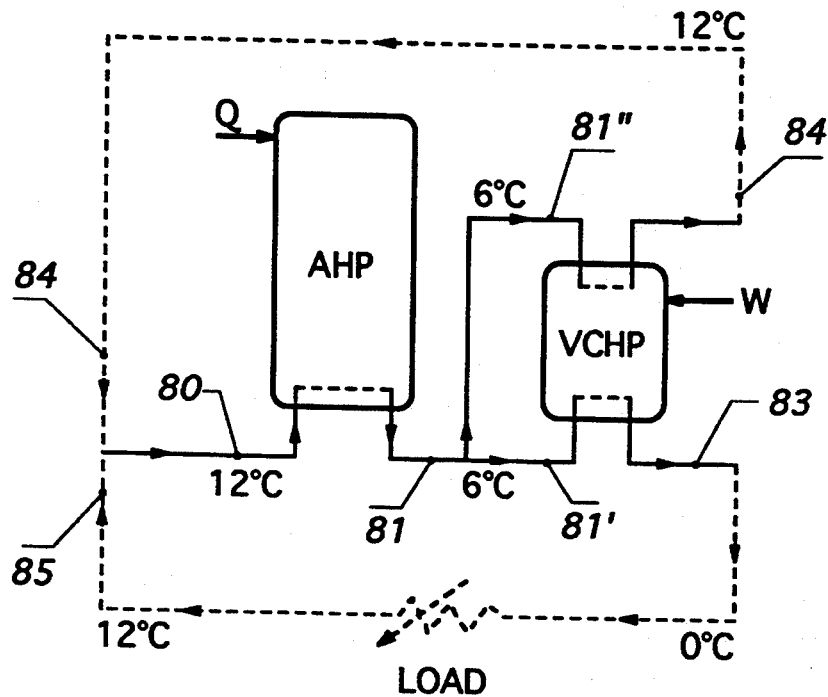
Figure 7D:
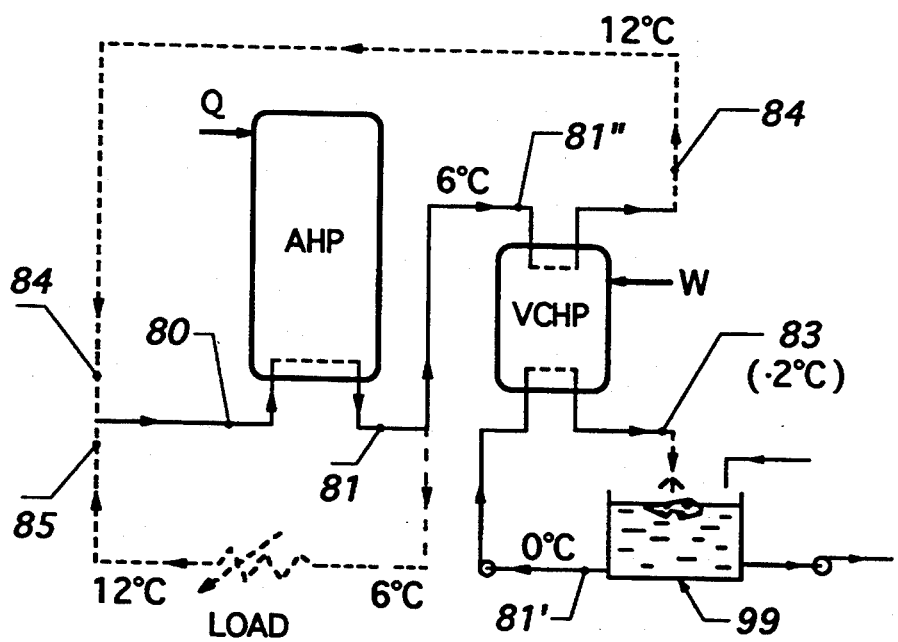

The above-described cascade arrangements are of course capable of supercooling water and generating either solid ice, snow or ice slurries. For example, the system shown in FIG. 7c is capable of delivering supercooled water at $-2°$ C. directly. In the case of building-cooling systems with ice storage, ice could be made during off-peak hours, for later daytime use. A night-operation scheme could then look like the one shown in FIG. 7d; in such a case, the AHP would operate at part load, generating cooling water both for the condenser of said VCHP and for the nighttime (reduced) building load, said building then being cooled using 6° C. water The above described cascade arrangements are also capable of cooling almost any liquid down to temperatures below their so-called freezing point. Moreover, it should be stressed that the working pair in the AHPs is not limited to LiBr-$H_2O$.

Non-azeotropic refrigerant mixtures

The multiple-subsystem arrangements described above are rather expensive. Using non-azeotropic refrigerant mixtures (NARM) inside a single chiller will help decrease costs and further improve on the operating efficiency. Indeed, with this type of refrigerant, phase changes are not constant temperature processes; it is thus possible to keep a small and constant $\Delta T$ between the fluid and the refrigerant. Depending on the composition of said NARM, the evaporation in the CSHE can induce a 10°, 20° or even 30° C. temperature increase (or glide). A corresponding decrease in temperature will happen in the HSHE, during condensation.

There are two main criteria for an efficient machine of this type. The first is that the temperature glide of the refrigerant during phase change be the same as the temperature glide of the fluid, in the evaporator as well as in the condenser. The other criterion is that both the evaporator and the condenser be counter-flow heat exchangers. The conventional flooded shell-and-tube HX (cooler) is thus inappropriate for such an application. In very small systems, the best type of HX for real counterflow heat exchange is the basic double-pipe or tube-in-tube element. For large systems, however, other arrangements have to be found. A real counterflow HX suitable both for secondary refrigerants and for non-azeotropic phase-change fluids, and designed according to the present invention, is shown in FIG. 8: it is what we might call a one-tube-side-pass "shell-and-multi-double-tube" cooler featuring three tubesheets (7a, 7b, 7c) at each end. It provides full counterflow without presenting any limit to the maximum capacity. It can be built with any convenient number of passes, both on the fluid side and on the refrigerant side. If modified according to the general principles explained above, it can also be used to generate supercooled liquids. A simplified counter-current cooler will be described later. As already mentioned, it is also possible to build counter-current plate-type coolers designed according to the present invention.

It has also been mentioned that for maximum system efficiency, the fluid-side temperature glide must match exactly the one on the refrigerant side. In practice, the perfect refrigerant mixture, with a perfectly linear temperature glide, might never be found. Fluid-side and/or refrigerant-side parameters will thus have to be adjusted accordingly to try and keep the refrigerant-to-fluid $\Delta T$ as uniform as possible from cooler inlet to exit, and also from condenser inlet to exit.

Improved cycles

Figure 9A:
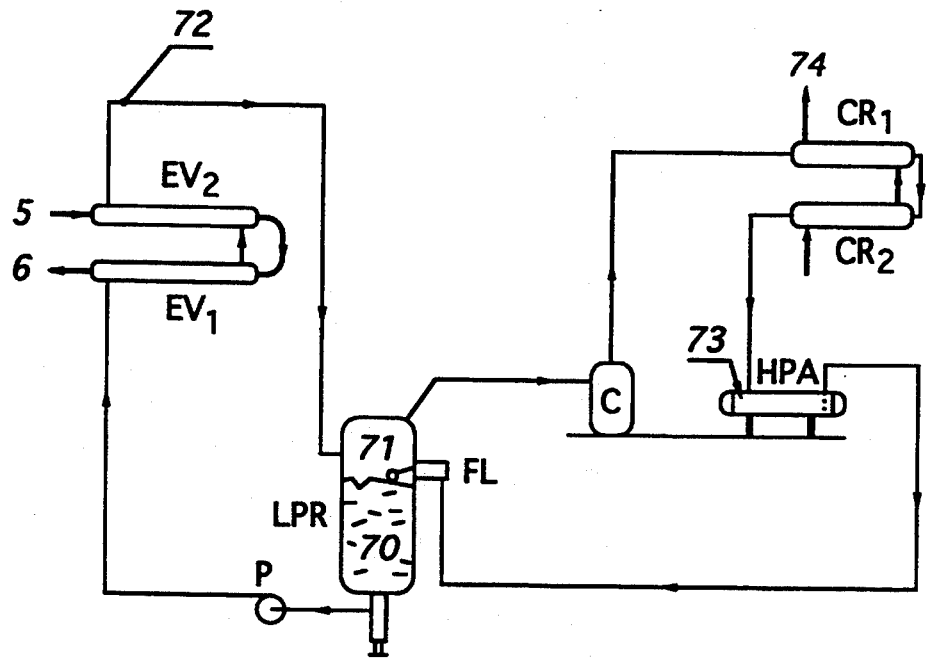

FIG. 9a shows an improved VCHP cycle featuring a low-pressure receiver, LPR, acting as a reformer (i.e. a partial distiller), capable of partially separating the components of the NARM: the liquid at the bottom, rich in high-boiling-temperature (less volatile, more dense) component(s) (70) leaves, going towards the pump P and the evaporator EV, while the vapor (71), being rich in the low-boiling-temperature component(s) (more volatile) leaves, going towards the compressor C. A fresh flow of partially evaporated refrigerant mixture (72) comes from an overfed evaporator EV, appearing here as a two-shell HX (EV1, EV2). Said fresh flow (72) provides the reservoir LPR with vapor (71) for the compressor (C) as well as with new liquid (70) for the evaporator, said liquid and vapor having roughly the needed composition. Liquid refrigerant also comes at a smaller rate through valve FL from condenser CR (appearing here as a two-part HX, $CR_1$ and $CR_2$) and high-pressure accumulator HPA. The liquid (5) to be chilled flows counter-current to the flow of refrigerant in evaporator EV and leaves at (6). Condenser cooling water also flows counter-current to the refrigerant in condenser CR.

The particular choice of refrigerant mixture is partly dependant on the temperature differential needed in the evaporator, on the fluid side. An almost infinite number of NARM can be used. A possible choice, for example, is the pair R13B1/R152a: the high density of the first component provides a high system capacity while the high latent heat of the second provides superior efficiency. Another possibility is the pair R22/R114. Many other binary or ternary mixtures are possible. It should be noted that if the overfeed rate is large, the refrigerant (R) will behave in the cooler (9) almost like a (non-evaporating) highly subcooled fluid. The design of the coolers (9) can then be simplified, as will be seen below. The pump P is capable of providing us with that large flow. In a way, the cycle is thus similar to the well known liquid-overfeed system, which has many well known advantages: smaller sized components, high system efficiency and well reduced operating costs (ASHRAE Handbook: op. cit.).

This basic cycle can be modified and/or improved upon in different ways; what is important is the presence here of a reformer LPR which permits sending mixtures of different composition to the hot side and the cold side of the heat pump circuit. How different these compositions will be, depends in a large part upon the overfeed rate through the evaporator. It also depends upon the NARM chosen. To give an idea, the denser component can represent more than 75% of the total mass flow in compressor C, but less than 50% in evaporator EV; i.e. the concentration of the dense component can thus go from 1:1 in the evaporator to 3:1 in the compressor (C). The higher the density of the vapor going to the compressor (C), the greater the capacity of the system.

Figure 9B:
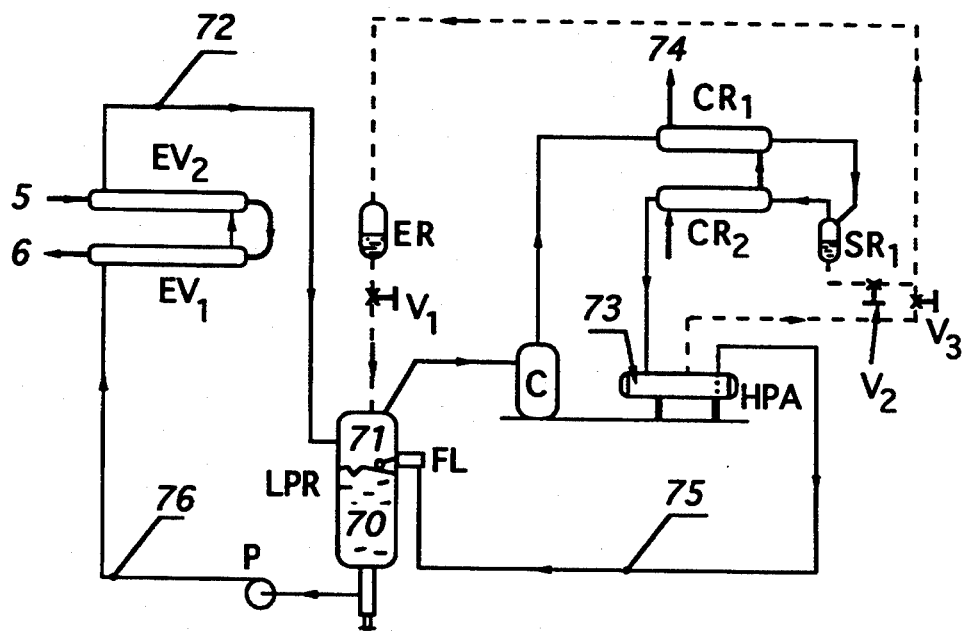

The capacity of such a system can also be modulated by using methods similar to the ones used in more "conventional" systems. For example, the extraction system shown in FIG. 9b can change the average level of pressure and density in the system, permitting a modulation of the capacity (dayly, weekly or seasonal modulation). This is done by removing from circulation (extracting and temporarily storing) some refrigerant extracted from either one of two points: at or near the condenser exit, for example at the top (73) of the high-pressure receiver HPA; or along the condenser itself, immediately after the point where the desuperheating is complete (about one fourth to one third of the way along the condenser), using separator reservoir SR1.

Vapor at the top of HPA is rich in the low-boiler, volatile, higher-density component(s): removing this vapor from the circuit (via valve $V_3$), by condensing it and storing it in the extraction receiver ER, will give a decrease in system capacity. Extracting the liquid (rich in the high-boiler, non-volatile components) from the bottom of SR1 (via valve $V_2$) will have the opposite effect. The valves $V_1$ to $V_3$, which control the extraction process, can be made to respond automatically to a change in demand.

At part load conditions there will be changes in temperature glide of the fluid along the cooler. The refrigerant temperature glide in the evaporator EV should thus be changed to keep a good match. This in turn will change the glide in the condenser CR: a change in condenser fluid flow (74) will keep a good temperature-glide match there. This change in the refrigerant temperature glide along the cooler EV can be accomplished in different ways; for example, by varying the refrigerant mass-flow rate through said cooler: a variable-speed drive on the pump P can achieve this.

Figure 9C:
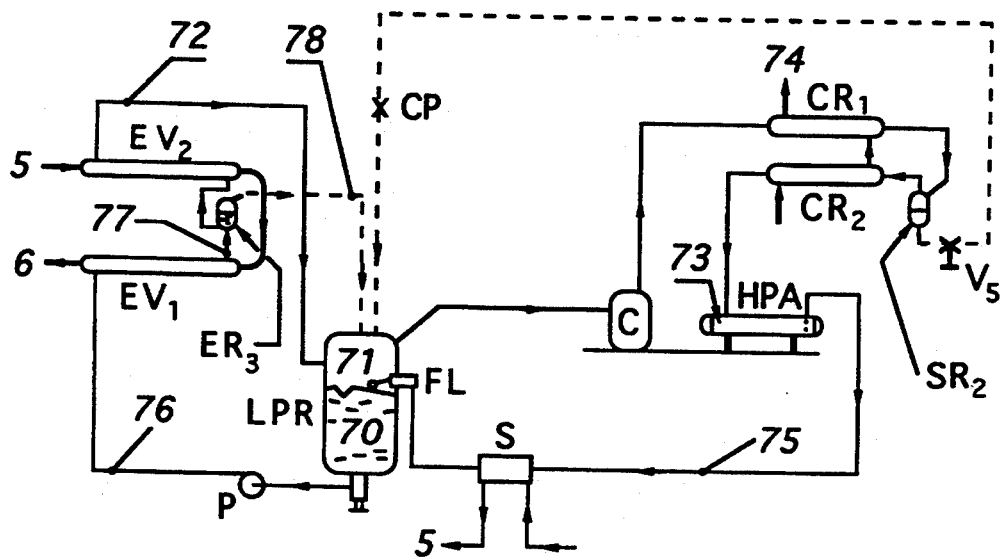

Other methods can be used which will at the same time improve on the cycle performance. For example, a subcooler S can be installed: the liquid (75) from condenser CR and/or high pressure accumulator HPA is subcooled by giving up heat to the cold liquid (76) coming from pump P. Said subcooling of said liquid refrigerant (75) can also be obtained by putting it in indirect contact (75) with cool liquid about to enter (5) the cooler EV (FIG. 9c).

Removing the already vaporized refrigerant at the exit of $EV_1$ (77) (FIG. 9c) and sending it (78) directly to reformer LPR will also ensure a still larger concentration of non-volatile components in cooler $EV_2$ and more of the dense vapor at the top of reformer LPR, thus improving cycle capacity and efficiency. In a similar fashion, extracting some liquid from the bottom of $SR_2$ and sending it to the reformer LPR (via valve $V_5$ and expansion device CP) will ensure that the mixture entering $CR_2$ is rich in volatile component(s), thus improving on the heat-transfer properties on the refrigerant side in $CR_2$.

Another interesting modification to the cycle is the overfeeding of the condenser, the idea being to send into the condenser CR more vapor than it is capable of condensing in one pass. This will have at least three positive effects. First, said overfeeding will permit sending a denser mixture to the compressor C; this, as we have seen, is very desirable. It will also improve on the heat-transfer coefficient (HTC) on the refrigerant side, said HTC being known to be quite low for all condensing NARMs. A large value of said HTC will reduce the size and cost of said condenser CR. It will also decrease the $\Delta T$ between refrigerant and coolant in said CR, thus improving system COP. Different circuits could be imagined for doing said overfeeding; what is new here is the condenser overfeeding itself, and the fact that it is used in a circuit with NARM.

Figure 9D:
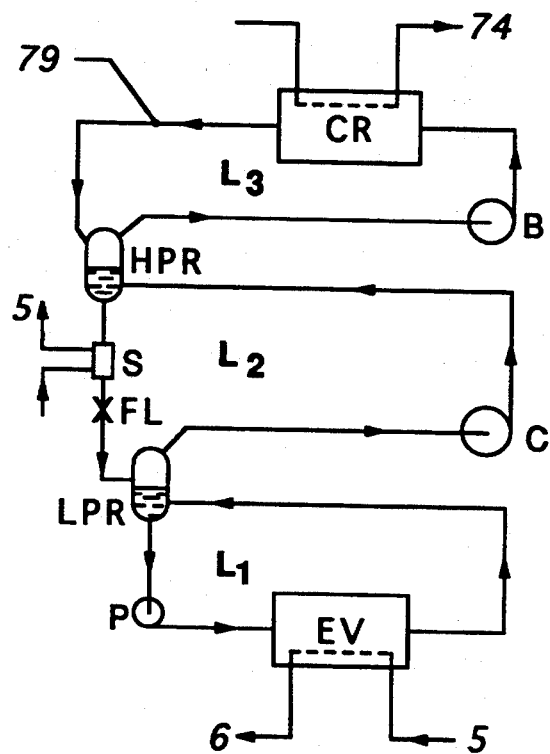

For example, FIG. 9d shows a cycle featuring a low-pressure reformer LPR, an overfed evaporator EV within a low-pressure circuit $L_1$, an overfed condenser CR within a high-pressure circuit $L_3$, and, in between, a compression circuit $L_2$. Said high-pressure circuit $L_3$ also comprises a high-pressure reformer HPR for partially separating the refrigerant mixture (79) into its components. $L_1$ and $L_2$ are thus connected via LPR; $L_2$ and $L_3$ are connected via HPR. Said mixture (79) out of the condenser CR is not completely condensed: its liquid part, poor in dense component(s), will accumulate at the bottom of HPR, from where it will go towards LPR, via expansion device FL; the vapor part in (79), rich in dense component(s), will be re-routed to the condenser CR by the blower B. Said blower B is capable of overfeeding said condenser CR, the overfeed rate having any value, including 1. Said blower B and said pump P will thus have very similar functions.

The cycle in FIG. 9d can also be used with advantage with pure refrigerants or with azeotropic mixtures of refrigerants. In this case, HPR and LPR will simply become liquid-vapor separators. Said overfeeding in CR and/or EV will still be very useful because of its potential for improving system COP and decreasing costs. Said condenser overfeeding can be used independently of said evaporator overfeeding. For example, a condenser overfeeding system would be perfect in an application like the one shown in FIG. 7b, where calculations show that $AHP_2$'s evaporator will normally be unable to completely condense the refrigerant circulated in circuit $VCHP_2$; the same thing being said for $AHP_3$. More than one of the above-described cycle modifications (FIGS. 9b to 9d) could be implemented at the same time, if desired. FIG. 10 schematically shows a countercurrent cooler designed according to the invention and having one shell-side pass and one tube-side pass. The number of liquid conduit means (10) in the shell (9) can be as large as needed. When used with one of the systems shown in FIG. 9, such a cooler is capable of providing whatever fluid $\Delta T$ is needed, assuming the shell (9) is long enough. With a large refrigerant flow rate (high overfeed rate), the relative volume-flow rate of vapor generated will be small and the cooler will behave almost like a true countercurrent liquid-to-liquid HX, the closeness of the fluid tubes providing the guiding walls needed by the refrigerant for an orderly countercurrent flow: the tube-in-tube arrangement of FIG. 8 is thus unnecessary here. Still more orderly flow could be obtained with conduit means (10) featuring longitudinal fins. FIGS. 10a and 10b show quite clearly how the mere presence of 2 longitudinal fins per conduit means (10) could provide very good flow guidance as well as improved heat transfer. Of course, many other fin arrangements could be used.

The cooler (9) of FIG. 10 could be further improved upon with the installation of a tubesheet (37) made out of a porous material or out of any material providing a small pressure drop, for the purpose of improving the crosswise evenness of the refrigerant flow in the cooler. A second porous tubesheet (37) could also be installed in a similar fashion at the other end of the cooler. Such a cooler (9) will give the same good results as the one shown in FIG. 8, being particularly useful with liquid-overfeed systems and/or with non-azeotropic refrigerants, but with reduced size, complexity and cost. In the case of more conventional cycles (without a reformer LPR), the said porous tubesheet (37) could also perform part of the "expansion" of the liquid refrigerant exiting from the hot side of the heat pump.

Liquid "expansion" from high to low pressure inside the cooler (9) itself could be performed in many other ways. For example, one of the fluid conduit means (10) inside said cooler (9) could be replaced by a capillary tube extending between tubesheet 7b and tubesheet 7b; the liquid refrigerant under pressure would, for example, enter space 13', where it would be partly subcooled, go through said capillary tube while being cooled (countercurrent) by neighbouring evaporating refrigerant mixture R. After going through cooler EV, said liquid refrigerant would have a reduced pressure and would be sent directly to reservoir LPR (valve FL then being superfluous). For a fluid $\Delta T$ of 13° C., the single shell of cooler (9) in FIG. 10 would have to be quite long. Its length could be cut in half by installing two shorter shells in series. Building each one of said shorter shells with two shell-side passes and two tube-side passes would further reduce the length of said shorter shells for a given fluid $\Delta T$. Many such combinations could be imagined. Of course, the counterflow cooler (9) of FIG. 10 and all of its possible adaptations can be made to handle supercooled liquids by applying the general principles explained above.

APPLICATIONS OF THE HIGH-EFFICIENCY CHILLER

The high efficiency chiller has obvious applications in the field of space cooling. It also has many other applications in very diversified fields. Following are more details on some of these applications.

Space cooling

The liquid chillers described above can be used in a large number of cooling applications, especially space cooling. For example, in retrofit applications, the (SUPERPAC) full-range chiller can be installed in series with a conventional chiller to obtain water at any temperature between 6° C. and 0° C. (using one SUPERPAC unit or, preferably, two SUPERPAC units in series, for better efficiency). A final temperature of 0° C. would give an increase in system capacity of more than 100% without any change in the size of the main chilled-water line.

If a further increase in capacity is ever needed, another cooler capable of generating supercooled water can be installed in series: when sent to a reservoir, this supercooled water can be made to partially change phase: the ice crystals are accumulated while the liquid is recirculated to obtain more ice. The floating ice crystals can be used for short or long term energy storage. The water at the bottom of the reservoir can be circulated in the building and used as the energy transport fluid. The slurry itself can also be used as the energy transport fluid.

Another possible arrangement for obtaining an ice slurry for energy storage purposes would be the following: during off-peak hours, the lag unit (used normally for generating very cold water, e.g. at 0° C.), could be used to obtain supercooled water and ice crystals. During day time, this ice could be used to shave the peak load, while said lag unit would come back to its normal use, e.g. the cooling of water from 3° C. to 0° C. It should be noted that with CSHE inlet temperatures of 6° C. (or more), it is also possible to obtain oulet temperatures of, say, $-2°$ C. directly, within the same cooler, at the expense of efficiency, however.

The crystallization of supercooled liquids (e.g. inside the reservoir) can be obtained by a mechanical or thermal perturbation; for example, an abrupt change in direction, a vibration of any frequency (e.g. from a sonic or ultrasonic generator); by a cooling element (e.g. of the thermo-electric type) touching the liquid (e.g. partly under and partly above liquid level), etc.; or by seeding the supercooled liquid with ice crystal or a piece of ice obtained elsewhere.

When one tries to accumulate a large quantity of large crystals in a reservoir, a difficulty often arises: the cristals tend to accumulate and pile up at one spot. This can create problems. A simple solution is to have a multitude of small jets uniformly distributed all over the surface of the reservoir, rather than having one or two large jets: this will create a multitude of small heaps rather than a large one. This is easily done when the system is built like the one in FIG. 4c: tube extensions are then supported in such a way that said resulting jets are uniformly distributed. This problem, however, is less likely to happen when the crystals are generated at lower supercooling temperatures (say, below 1,6° C. for pure water): the crystals are then very fine and the resulting "slush" tends to flow like a thick fluid and does not pile up to any great extent.

The ice slurry accumulating in the reservoir is probably the ideal energy transport fluid, in new installations as well as in retrofit situations: at the proper solids concentration (e.g. 20%), it will circulate in pipes, pumps and heat exchangers. Its energy absorption capability being more than 4 times that of liquid water at 6° C., mass flows in main lines will be 4 times less, pumping power will be about 5 times less, line diameters about 50% smaller, etc. Different storage strategies can be utilized depending on the application, the main advantage always being that pure water can be used instead of solutions containing glycol or other environmentally sensitive freezing-point depressants. If desired, however, additives can be added to the slurry to further improve its characteristics: anti-friction and anti-corrosion additives, dispersants that will prevent the agglomeration of the crystals, etc.

Another way of destroying ice-crystal agglomerations very efficiently, without using much external energy, is the installation of mixers inside said reservoir (26), for example of slowly-rotating giant "egg beaters". Preliminary tests have shown that such a device, when properly located (e.g. in front of the outlet (42)), keeps the ice cristals in constant motion in the reservoir and induces a well-behaved slurry flow into inlet (42) and conduit means (28).

Heat pumps

The coolers constructed according to the present invention can also be used as CSHE for liquid-source heat pumps, using conventional cycles as well as the new improved cycles described above. Indeed, with a CSHE design such as the one in FIG. 1, for example, water cooled to about 2° C. or 3° C. can be used as a source of heat, for space heating as well as for many other uses. In the case of saline water, the temperature of the source can be as low as 0° C. This cannot be done with other types of CSHE now on the market. With CSHE designs such as the ones shown in FIG. 4, 5, etc., liquids at the freezing point (e.g. from a lake, during the winter period) can be used as a heat source. The supercooled water coming out of the machine is simply returned to the large body of water where it will tend, being lighter than water at 4° C. (and at 0° C.), to rise to the surface and mix with the ambiant water; if ice is generated by this mixing process, it will tend to float on the surface. Such heat pumps can be used for space heating. They can also be used in many special situations, e.g. snow-melting plants, mine heating systems, etc.

Snow-making machines

Most ski slopes are now equipped with one type or another of snow-making machines. The machine-made snow, however, is often of poor quality: depending on the ambiant conditions, it will sometimes have the look and feel of hard ice pebbles, sometimes of wet slush, rarely that of real snow. The difference in quality comes from the fact that real snow is made from deeply supercooled water droplets (i.e. the clouds).

Contrary to what happens in conventional snow-making machines, it is possible, with the invention, to directly obtain all the supercooled water needed, without the help of the cold ambiant air. When a jet of said supercooled water from a conduit means is changed into a flow of droplets (e.g. because of the action of turbulent viscous forces between a jet of air and said supercooled water jet), the resulting supercooled droplets, being in a metastable state, will rapidly start freezing in a dendritic fashion, said droplets becoming mixtures of dendritic ice and water which, in a cold ambiance (e.g. ambiant air), will grow to full-size snow flakes, because of the heat and mass transfers (convection and evaporation between droplets and ambiance) involved.

There is no limitation as to the method used for delivering said supercooled liquid into droplet form, the basic parameter being the fact that the snow is made here from liquid previously cooled or supercooled by a machine. For example, if a flow of supercooled water exits from a nozzle at high velocity, said water is thrown at great distances. The turbulence generated by the friction between air and said water is capable of changing the stream of supercooled water into a multitude of supercooled droplets: said changing of the type of stream is a disturbance capable of initiating the phase-change process of the metastable droplets. As the droplets travel through cold air at high speed, they lose heat (by convection and evaporation) and thus continue to grow into full size snowflakes. Such a snow-making process does not need compressed air and is therefore very energy efficient.

The atomizer shown in FIG. 11 is also capable of generating very small droplets: supercooled liquid (90) flows out of a conduit (91) as a thin, wide film (93); compressed air (94) going through tube (95) and through a nozzle (96) provides a high-speed jet of air. Depending on the type of nozzle, said jet can be subsonic, sonic or supersonic. A well designed nozzle will produce an almost isentropic expansion; the result will be a very cold, high-speed air jet requiring relatively small upstream pressures, thus saving some energy. Said air jet is then blown through said thin liquid film (93) of supercooled liquid, changing the film flow into a small droplet flow (97). As mentioned earlier, tip (92) of said tube (91) must be modified (e.g. said tip being heated) for reliable operation. When the partly frozen droplets generated by an atomizer are very small in size, like the ones generated by an atomizer similar to that of FIG. 11, they can also be used as seeders for larger droplets of cold liquid generated by more conventional methods: when the small dendritic crystal touches a larger drop of liquid which has been pre-cooled, e.g. by ambiant air, it provokes, in said larger drop, the beginning of the phase-change process. Many variations of the same theme are possible. For example, the air and water jets do not have to be at right angle to one another; they can be at any angle, including parallel. They can be side by side or concentric, the jet at the center being either the air jet or the supercooled-water jet. Both jets can be of any shape, e.g. circular, annular, etc. In such a system, the air jet is used mainly for changing the liquid stream into droplets (due to the action of turbulence) but also for accelerating the cooling process, and thus the speed of the phase change.

The supercooled water necessary for generating snow can sometimes be obtained (weather permitting) simply by circulating cold water in a properly designed air-to-water HX (v.g. a pipe loop or a plate HX located above ground in cold ambiant air). Such a system would be more difficult to control but would save energy. The HX would have to be designed according to the invention.

Water being used for generating snow normally arrives at the snow-making machine at a temperature approaching 1° C. But in certain weather conditions and/or at certain times of the year, approaching water can be at a temperature as high as 5° C. or more. In order to be able to manufacture high quality snow, it is then preferable to precool said approaching water down to 1° C. or below with a full-range chiller, i.e. with the invention, even when using conventional snow-making machines down the line.

Instead of using ambiant air for providing further cooling of water droplets and/or for completing the phase change process, a flow of colder air could be used, said colder air having been cooled by some type of HX, e.g. the CSHE of a refrigerating system, or some other device. It would then be possible to generate snow in difficult weather conditions, e.g. when the wet-bulb temperature of the ambiant air is at or slightly above 0° C.

An even better way of manufacturing snow independently of the atmospheric conditions is the following. As already mentioned, when sent to a reservoir, a flow of supercooled water can be made to partially change phase: 1,25% of the mass flow, per degree of supercooling, becomes solid. The ice crystals can be made to accumulate in said reservoir while the liquid part is recirculated to obtain more ice. It is possible to obtain different types of crystals, depending on the operating conditions. For example, if tap water is supercooled down to about $-0,8°$ C. ($\pm 0,1°$ C., approximately) and sent to said reservoir, and if crystallization is provoked, the resulting crystals will be very similar to snow. More (or less) supercooling can be used (e.g. using temperatures of $-0,6°$ C.), but the resulting "snow" will look and feel less natural, higher temperatures producing larger and dryer crystals, lower temperatures giving the inverse result. One way of "harvesting" this snow is simply to keep operating the machine until there is practically no liquid left in said reservoir: we then end up with a reservoir full of high-quality snow.

Many other methods of harvesting the snow are possible. For example, the supercooled water jets can be made to crystallize on a plate, a piece of screen or any other type of support located above the liquid surface of the reservoir; after the desired thickness of crystals has accumulated on said support (say, 50 cm or 1 m), said support and crystals are removed from underneath said jets of supercooled water and liquid water remaining between crystals is left to drain for a few minutes. The result again is high quality snow. If said support were a slowly-moving conveyor belt, the handling of said snow would be easier, especially when large quantities of snow are needed. The quality of this snow can be further improved by removing the small amount of humidity still remaining between crystals. Different methods exist to perform this removal. Centrifugal action is one.

A high-capacity machine fitted with a large reservoir would be capable of generating enough snow to cover a ski slope. Skiing during summertime thus becomes possible. The snow on the ground will last longer if insulation (preferably porous) was installed below the snow cover. Or said ground could be kept cold artificially with an underground refrigerating system. This type of high-quality snow can also be used for many other purposes.

Freeze concentration

Freeze concentration (FC) applications are divided into two categories. In the first one, the desired product is the solvent and the degree of concentration is low because the concentrate is easily disposed of. Water desalination is an example: the concentrate (e.g. 50% or more of the original solution) is discharged scharged back into the sea. In the second category, the desired product is the concentrate. A relatively high concentration is needed; what is disposed of is the solvent. Examples are the concentration of acids, alkali, milk, salts, coffee extract, etc. Being formed without any physical constraint, the ice crystals formed from a supercooled aqueous liquid flow are absolutely pure solid water. Supercooling can thus become the basic process in a new freeze concentration method. An example is that of obtaining potable water from polluted water. When separated from the original solution, washed clean and melted, the crystals become pure water.

The separation process can be very simple: indeed, crystallization and separation can be made in a single operation. For example, sending a jet of supercooled water (from a reservoir or directly from a cooler) onto a conveyor belt (made of any convenient material, including thin perforated sheet metal) creates a mechanical shock which will initiate the crystalization process, the crystals remaining on the belt while the liquid is drained back into the reservoir. The accumulated crystals can then be moved elsewhere (v.g. into a wash column) by the belt. Other crystallization methods are possible, including vibrations from a sonic or an ultrasonic generator. Other separation methods are possible, including centrifugation.

The cleaning of crystals can be done in wash columns. This is a relatively mature technology and two types of systems are used: the gravity column and the pressurized column. The former is very tall, the height thus being sufficient to squeeze the ice bed, helping in the final cleaning process, which is done by introducing wash liquid at the top of the column. Said wash liquid is obtained from melted pure crystals. In pressurized columns, hydraulic pressure forces the wash liquid to flow down.

An important advantage of the invention in FC applications is the fact that by modifying the operating conditions, the crystal size can easily be changed. "Deeply" supercooled liquids (e.g. $-1,5°$ C. water) will produce soft and fragile dendritic ice, while slightly supercooled liquids (e.g. $-0,5°$ C. water) will give hard ice: blocks of pure ice having a mass of several kg have even been obtained during experiments with supercooled water at $-0,5°$ C. Such blocks are obviously very easy to clean, without the expense of wash columns. Different installations can be imagined permitting the fabrication of much larger blocks of pure ice. For example, one can imagine that a large flow of supercooled water at $-0,5°$ C. has been generated; directing one or more jets of such water along a large plate will permit hard ice to build up to unlimited thicknesses on the plate.

In such an installation, it would be better (but not necessary) for the plate to be slightly cooled by some type of cooling system for two reasons. First, it would be easier to induce crystallization at the beginning of the process (crystallization of 0,5° C. water is relatively difficult to induce; but once started, it is self propagating); second, it would prevent the ice from slipping away from the plate, which would preferably be slanted a few degrees from a horizontal position to facilitate the draining of the liquid. Temporarily stopping the plate-cooling process would permit the block of ice to slip and be transported to a nearby reservoir where it could be melted. The entire process could easily be automated. It is important to realize here that the slight cooling of the said plate is not performed for freezing the supercooled water but to help in the handling process.

From what has been said above, it can be concluded that the temperature of the supercooled-liquid flow is the dominant factor controlling the type of ice generated. But there are other significant parameters, like the jet velocity (speed and direction), the diameter of said jet, the number of jets arriving at one point, etc.; it has been found that these other parameters have an important effect on the form of the ice crystals. For example, by varying the velocity of a jet of −0,5° C. water, it is possible to go from a crude stalagmite shape to a lovely flower having regularly shaped petals The invention also provides another interesting solid/liquid separation process. It works like this. As said earlier, supercooled liquids can be stored in reservoirs. Moreover, if supercooling is to be obtained at the cooler (9) exit (5), crystals (24) should be prevented from entering the liquid cooler (9), e.g. by using a filter (52) (FIG. 4c), as said in a previous patent, (op. cit.). Simple cotton filters (pieces of old bed sheets covering a perforated 40 cm length of 5 cm diameter piping!) have been used successfully for this purpose. When crystallization is not provoked (26), the bulk of the liquid (25) slowly becomes supercooled inside said reservoir (26); ice then starts to build up all over said filter (52), said filter (52) acting as a crystallizer. Said ice is relatively porous, so that liquid (5) keeps flowing towards pump P: ice thicknesses of up to 3 cm have been obtained over said filter. Also, said ice is relatively hard and quite easy to remove by hand from around said filter (52). Said ice being easy to wash clean, this phenomenon can be used as the basis for a simple freeze concentration method. Several variations of the same theme could be imagined. For example, the "filter" does not have to be installed as in FIG. 4c; and it can have any shape; be made of any material; it could be the whole bottom of said reservoir (26); or it could be its side walls; or a large perforated plate located anywhere inside the reservoir (26), the liquid (25) being sucked from both sides of said plate. The harvesting of the resulting ice can easily be automated.

Melting of ice crystals can be done with the energy from any source, including that from the HSHE of the machine; or with the energy from a building to be air conditioned: one then has a dual-purpose system capable of purifying polluted water (or desalinating sea water, or treating waste water, e.g. industrial) and cooling a building. Other dual-purpose systems could be imagined.

Water conditioning in aquaculture applications,

Fish hatcheries, and aquaculture installations in general, have huge energy needs for conditioning the water in which the different types of fish will grow. In northern climates, when the water is available only from, say, a small river, the range of temperatures of said water will often go from 0° C. to 20° C. Both temperature extremes are unfit for hatcheries, which, ideally, need temperatures between 12° C. and 14° C. This implies heating said water in winter and cooling it in summer. Since the flow rates needed are often huge, it is vital to use the most efficient heating method. This implies recuperating the greatest amount of energy from the gray water overflowing from the fish tank. This maximum recuperation, in winter, means bringing the gray water from say 14° C. back to 0° C. or less, the recuperated energy being used for heating the fresh water from 0° C. to 14° C.

This can be done with very little external energy using a modified version of the invention. The system is shown in FIG. 12a: the heat pump circuit will usually be of the VCHP type, and the type of evaporator used will be any of those described above. In this system, however, most of said heating is performed in a passive way by using a liquid-liquid HX, the remainder of the heating being performed by the HSHE of the heat pump, said heat pump also having a CSHE, said CSHE being capable, when necessary, to supercool said rejected liquid.

The system works this way. Fresh water (101) is drawn say from a river (100) at 0° C. and sent (102) by a pump P1 through HX, where heat is absorbed. Said fresh water thus comes out (103) of HX at, say, 12° C. and goes through the HSHE where its temperature is again increased to about 14,5° C. Said fresh water (104) then enters the fish tank (105). Some evaporation exists over said tank (105) and the gray water coming out (106) of said tank (105) is at a temperature of about 14° C. Another pump P2 sends said gray water (107) through HX, where it gives its heat to incoming fresh water (102). Said grey water then goes (108) through said CSHE, where it loses the remainder of its energy: said gray water comes out (109) of said CSHE at a temperature of about 0° C. and is sent back into the river (100).

The above-described system of FIG. 12a needs a CSHE capable of supercooling water. Indeed, when said system is started up in wintertime, circulating pumps P1 and P2 are first switched on: the temperatures are then uniform at 0° C. When the heat-pump circuit is started, the water then entering (108) the CSHE is at 0° C. and will remain so for a considerable length of time. The water coming out (109) of the CSHE will thus be supercooled to about −2° C. As the temperature in said tank (105) slowly increases to 14° C., the temperature at point 108 will slowly increase to 2° C. and the temperature at point 109 will slowly increase to 0° C.

Assuming normal operating conditions and further assuming an electrical input power of 1 $kW_e$ into compressor C, one can presume that the thermal output of said HSHE will be about 5 $kW_{th}$. From the indicated temperatures in the water circulation system (FIG. 12a), one can deduce that the contribution of HX to the heating process will then be about 24 $kW_{th}$, for a total heating power of 29 $kW_{th}$. Considering the assumed compressor C input power, the overall COP of the installation will thus be 29.

As the river temperature increases in springtime, operating conditions will change. The machine thus needs controls in order to insure continuous optimum efficiency. During summertime, the river water temperature will often be above the tank design temperature of, say, 14° C. Some fresh-water cooling will thus have to be performed. The water circuit would be altered and the system would appear as the one shown schematically in FIG. 12b, where it is seen that most of the cooling is obtained with HX. Of course, temperature values indicated in FIGS. 12a and 12b are approximate and will depend on many factors, including the design of the HX, the capacity of the heat pumping circuit, the ambiant conditions around the fish tank, etc. Moreover, many modifications can be incorporated into the heat-pumping circuit in order to further improve its efficiency, e.g. the use of a refrigerant subcooling heat exchanger, installed, for example, along the gray water line (108) between HX and CSHE.

In a situation when water at about 7° C. is available from a ground source all year round, the same component arrangement as the one in FIG. 12a can be used. In such a case, however, the CSHE will never have to supercool water, which simplifies CSHE construction. The high-efficiency system described here is rendered possible because the water temperature at the tank outlet is almost the same as the one at the inlet. Whenever this is the case, similar efficient systems could be installed.

Miscellaneous applications

Cold or supercooled water from a full-range chiller can be used in the fishing industry. In fishing boats, it will keep the fish fresh, these being sprayed directly with said cold or supercooled water. In the case of a supercooled water spray, some ice crystals will normally form on and around the fish. In the fish plant, said water can be used for washing the fish. Said water can also be sprayed onto the fish before or after it is prepared by the workers to make sure that it stays cold and fresh.

Said cold or supercooled water (or the ice slurry formed with the latter) can also be used for the mixing of concrete. Indeed, problems arise during the construction of dams, bridges, etc., because of the heat generated during the hardening of the thick concrete. A solution is the mixing of the concrete using very cold water, supercooled water or an ice slurry, all of which can be obtained with the above-described technology.

The new cooler designs presented above have often been described as parts of VCHP systems. Absorption and chemical heat pump systems were also briefly mentioned. It is worth mentioning that the new cooler designs can be used, if desired, within any of the known (and future) heat pumping cycles; even as part of far-fetched cooling "cycles"like the sound-wave cooling method. Two or more very different cycles can even be used in a cascade arrangement. There is no limitation as to the phase of the cold medium used in the cooler (e.g. liquid, gas). There is no limitation as to the method of circulation of the refrigerant in the cooler (e.g. spray type, overfeed type, etc.). There is no limitation as to the type of liquid refrigerant used in the system: primary (halocarbons, etc.) or secondary (e.g. brine, etc). There is no limitation as to the number of components in the liquid refrigerant: single component refrigerants or multi-component mixtures of refrigerants can be used. There is no limitation as to the type of liquid chilled or supercooled: acids, alkalis, coffee extracts, water, etc. When the term ice crystal is mentioned, it can actually be a crystal made out of any liquid, e.g. pivalic acid crystalizing from a methanol solution. When water is mentioned in the above text, there is no limitation as to the purity of said water.

As we have seen, the basic ideas relating to cooler design presented above can also be applied to practically any cooler type, even to the very unusual: plate type, coil in shell, flooded shell-and-tube, shell-and-multi-double-tube, etc. All of these can be designed according to the general principles outlined above. There is no limitation as to the position of the cooler, e.g. horizontal or vertical. The counter-flow HXs described in this invention are not only for using with non-azeotropic refrigerants. When the term "tubesheet" is mentioned in the text, there is no limitation as to the number and type of "tubes" going through said tubesheets. There is no limitation as to the material used for making the conduit means and/or the shell and/or parts thereof: metals, plastics, etc. There is no limitation either as to the shape of the conduit-means cross-section: circular, oval, flattened, etc. Said conduit means can be provided with internal and/or external fins. There is no limitation as to the exact fin size, shape, number and arrangement, except that in the case of supercooled liquid flows, the internal fins should respect the general principles stated in the invention, e.g. smooth flow, etc. There is no limitation either as to the fluid velocity and pressure inside said conduit means: velocities and pressures compatible with common HX design practice are acceptable. There is no limitation either as to the method of construction and assembly of the CSHE: all welded, expanded conduit means, etc. When double or triple tubesheets are used, there is no limitation as to the distance between said tubesheets. The space between said tubesheets can be partially or completely open to atmosphere. There is no limitation as to the nature of the insulation used for filling the said space: urethane foam, air, etc. Said insulation, in thin sheet form, could also be fixed to one or both tubesheets, on the cold or on the warmer side, depending on the application. There is no limitation as to the temperature of the fluid at the outlet of the CSHE: liquids can be cooled above, at, or below their phase equilibrium temperature (i.e. supercooled).

When supercooled, the exiting fluid can be partly changed to ice; there is no limitation as to the method of crystallization: any mechanical or thermal perturbation can be used, including vibrations, etc. Seeding with a crystal or a block of ice is another method. There is no limitation as to the type of solid-liquid separation method: conveyor belts, gravity draining, centrifugal drives, etc. There is no limitation as to the type of ice generated: depending on operating conditions, soft and fragile dendritic ice as well as hard ice can be obtained. There is no limitation as to the method of preventing ice from forming at the outlet of supercooled liquid conduits; if local heating is used, above or below liquid level, there is no limitation as to the heat transfer method used for heating: conduction, convection or radiation.

Coolers built according to the present invention do not have to be used within any particular heat-pumping cycle. Actually, said coolers can be used to obtain very cold or supercooled liquids or an ice slurry without using any thermodynamic cycle; for example, said cooler can be simply an air-to-liquid HX, said air being ambiant air. Other arrangements could be imagined.

As is common practice in the refrigeration and air-conditioning industries, cold parts of a "supercooler" must be thermally insulated, care being taken to prevent condensation on the cooler and on all other cold parts.

This new technology is given the name SUPERPAC, which stands for "SUPER Pompe A Chaleur. The chiller capable of generating supercooled liquids will be called a SUPERCHILLER and its evaporator will be called a SUPERCOOLER. Supercooled water generated with said invention will be called SUPER WATER. Ice obtained from a supercooled aqueous liquid will be called SUPER ICE. Snow obtained from the invention will be called SUPER SNOW. The thermodynamic cycles of FIG. 9 will be called SUPER CYCLES, even when said cycles are not being used to produce supercooled liquids.

I claim:

1. A liquid-cooling system comprising:
   a cooler containing a cold medium, said cooler having an inlet end provided with an inlet through which a liquid to be cooled arrives, said cooler also having an outlet end provided with an outlet through which the liquid cooled within the cooler exits, at least one conduit means mounted within the cooler and through which said liquid flows at an average velocity in order to get cooled by said cold medium, each of said at least one conduit means being straight or smoothly curved and extending within said cooler between one cooler head located at the inlet end of said cooler and an other cooler head located at the outlet end of said cooler, said one cooler head acting as a flow distributor for the liquid arriving through said inlet whereas said other cooler head acts as a flow receiver for the liquid having passed through each of said at least one conduit means, each one of said one and other cooler heads being spaced apart from said cold medium by a pair of spaced-apart tubesheets through which each of said at least one conduit means extends, each of said pair of spaced-apart tubesheets comprising an inner tubesheet and an outer tubesheet, said pair of tubesheets preventing said liquid which is stagnant within the adjacent cooler head or which flows therein at a velocity lower than said average velocity, from contacting a cold surface.

2. A liquid-cooling system according to claim 1 in which said cooler also comprises a cold-medium inlet through which said cold medium arrives, and a cold-medium outlet through which said cold medium exits, said cold-medium inlet being located near said outlet end through which said cooled liquid exits, said cold-medium outlet being located near said inlet end through which said liquid to be cooled arrives, said cooler also comprising a set of inner tubesheets located between the two said pairs of spaced-apart tubesheets, one tubesheet of said set of inner tubesheets being located near said pair of spaced-apart tubesheets adjacent to said one cooler head at said inlet end, the other tubesheet of said set of inner tubesheets being located near said pair of spaced-apart tubesheets adjacent to said other cooler head at said outlet end, and in which said cooler also comprises, around each of said at least one conduit means, an outer conduit means of a larger diameter, each of said outer conduit means only extending, within said cooler, between said one and said other tubesheet of said set of inner tubesheets, the annular space between said at least one conduit means and said outer conduit means becoming an annular conduit means through which said cold medium flows countercurrent to said liquid to be cooled flowing inside said at least one conduit means, the space between said one tubesheet of said set of inner tubesheets and adjacent inner tubesheet of said pair of spaced-apart tubesheets, located near said inlet end, acting as a cold-medium receiver for said cold medium having passed through each of said annular conduit means, said cold medium in said receiver then exiting through said cold-medium outlet, the space between said other tubesheet of said set of inner tubesheets and adjacent inner tubesheet of said pair of spaced-apart tubesheets located near said outlet end acting as a flow distributor for said cold medium arriving through said cold-medium inlet and thus being distributed into each of said annular conduit means, said cooler thus being converted into a shell-and-multi-double-tube cooler providing true counter-current heat exchange between said cold medium and said liquid.

3. A liquid-cooling system according to claim 1 in which said spaced-apart tubesheets at said inlet end of said cooler are located far enough from one another, so as to form a thermal barrier between said liquid within said one cooler head and said cold medium, the space between said spaced-apart tubesheets being filled with an insulating material, said spaced-apart tubesheets at said outlet end of said cooler being located far enough from one another, so as to form a thermal barrier between said liquid within said other cooler head and said cold medium, the space between said spaced-apart tubesheets also being filled with an insulating material.

4. A liquid-cooling system according to claim 1 in which said at least one conduit means of said cooler are provided with individual extensions, said at least one conduit means of said cooler thus extending past outer tubesheet of said pair of spaced-apart tubesheets at said inlet end, said individual extensions permitting the feeding of said at least one conduit means individually, using a distributor located at some distance upstream of said cooler, said individual extensions and location of said distributor preventing said liquid which is stagnant or which flows therein at a velocity lower than said average velocity from contacting a cold surface, thus rendering unnecessary the presence of said inner tubesheet of said pair of spaced-apart tubesheets at said inlet end.

5. A liquid-cooling system according to claim 1 in which said at least one conduit means of said cooler are provided with individual extensions, said at least one conduit means of said cooler thus extending past said outer tubesheet of said pair of spaced-apart tubesheets at said outlet end, said individual extensions thus protruding from said outside tubesheet into said other cooler head, in such a way that said cooler can be converted, when desired, into a supercooler capable of supercooling said liquid.

6. A liquid-cooling system according to claim 1 in which said inlet head and said outlet head of said cooler are redesigned in such way that said cooler becomes a multi-tubeside-pass cooler in which said liquid being cooled can pass a plurality of times.

7. A liquid-cooling system according to claim 3 in which said thermal barrier provided by said spaced-apart tubesheets is instead provided by solid insulating material fixed to said outer tubesheets of said pairs of spaced-apart tubesheets, said inner tubesheets of said pairs of spaced-apart tubesheets thus becoming superfluous.

8. A liquid-cooling system according to claim 1 in which said at least one conduit means of said cooler are provided with individual extensions, said at least one conduit means of said cooler thus extending past said outer tubesheet of said pair of spaced-apart tubesheets at said outlet end, cover of said cooler head at said outlet end of said cooler thus becoming superfluous, said liquid exiting from said cooler being fed by said individual extensions to a location where it is needed, said individual extensions eliminating regions of said stagnant liquid and eliminating regions where said cooled liquid flows at a velocity lower than said average velocity, thus rendering unnecessary inner tubesheet of said pair of spaced-apart tubesheets at said outlet end of said cooler, extremity of said individual extensions where said cooled liquid exits being equipped in such a way as to prevent the formation of ice crystals at said extremity, said extremity being colder than its ambiance, said cooler thus being capable of safely bringing said liquid to a temperature below its solid-liquid equilibrium temperature without provoking said freeze-ups, said liquid thus being transformed into a supercooled liquid, said cooler thus being transformed into a supercooler and said liquid-cooling system thus being transformed into a superchiller.

9. A liquid-cooling system according to claim 8 in which the prevention of said formation of ice crystals at said extremity is obtained by heating said extremity.

10. A liquid-cooling system according to claim 8 in which said supercooled liquid exiting from said supercooler is made to partially change phase, said phase change providing a slurry of solid and cold liquid, said slurry being at its phase-equilibrium temperature, the operating conditions of said liquid-cooling system being modulated in order to modify the type of solid material generated during said phase change, said conditions being mainly the temperature of supercooled liquid, a slight supercooling of less than about 0.5° C. favouring the generation of harder and larger crystals, their shape depending mainly on the way said supercooled liquid and said slurry is handled, a "deep" supercooling of more than about 1.2° C. tending to generate finer crystals, a medium supercooling tending to generate medium-size crystals.

11. A liquid-cooling system according to claim 8 in which said supercooled liquid exiting from said supercooler is made to partially change phase, said phase change providing a slurry of cold liquid and crystals, said slurry being at its phase-equilibrium temperature, said crystals, when separated from said slurry and when cleaned, becoming solids which are purer than said supercooled liquid from which they were made, said cooling system thus being capable of purifying liquids and concentrating solutions.

12. A liquid-cooling system according to claim 8 in which said supercooled liquid exiting from said supercooler is made to partially change phase, said phase change providing a slurry of cold liquid and crystals, said slurry being at its phase-equilibrium temperature, said crystals being accumulated until the desired solid/liquid ratio is achieved, said slurry being kept homogeneous and in constant motion by a mixing device, said slurry then being easily pumpable towards an other location.

13. A liquid-cooling system according to claim 8 in which said supercooled liquid exiting from said supercooler is fed to a reservoir where it is made to partially change phase, said change of phase providing a slurry of cold liquid and crystals at its phase-equilibrium temperature inside said reservoir, said supercooled liquid being fed to said reservoir under liquid level, said ambiance being said slurry.

14. A liquid-cooling system according to claim 8 in which said supercooled liquid exiting from said supercooler is fed to a reservoir where it is made to partially change phase, said change of phase providing a slurry of cold liquid and crystals at its phase-equilibrium temperature inside said reservoir, said supercooled liquid being fed to said reservoir above liquid level, said ambiance being the humid atmosphere above said reservoir.

15. A liquid-cooling system according to claim 8 in which said supercooled liquid exiting from said supercooler is stored in a reservoir, said supercooled liquid then being forced through a porous membrane, said membrane then acting as a crystallizer over which solid and porous ice builds up.

16. A liquid-cooling system according to claim 8 in which the flows from said at least one conduit means are joined in order to create a larger flow of supercooled liquid inside a larger conduit means, said joining being rendered safe by the elimination of all significant perturbations to said liquid flows.

17. A liquid-cooling system according to claim 16 in which said joining is performed by bringing said individual extensions close to one another, side by side, in such a way that said flows, which are then practically parallel, can be introduced into said other larger conduit means witout creating any significant perturbation.

18. A liquid-cooling system according to claim 8 in which said inlet head and said outlet head of said cooler are redesigned in such way that said cooler becomes a multi-tubeside-pass cooler in which said liquid can pass a plurality of times, passage from one pass to the other pass by said supercooled liquid being performed without causing any significant perturbation to said supercooled liquid by using individual U-bend connections between said at least one conduit means forming said one pass and said at least one conduit means forming said other pass.

19. A liquid-cooling system according to claim 1 in which said cooler is the cold-side heat exchanger of a heat pump, energy extracted from said liquid being transfered to the hot-side of said heat pump, said energy then being rejected at said hot side of said heat pump and used for heating purposes.

20. A liquid-cooling system according to claim 8 in which said cooler is the cold-side heat exchanger of a heat pump, energy extracted from said liquid then being rejected by the hot-side heat exchanger of said heat pump and used for heating purposes, said heat pump thus being capable of using, as a source of heat, liquids at their solid-liquid equilibrium temperature.

21. A liquid-cooling system according to claim 2 in which said outer conduit means of a larger diameter as well as said set of inner tube-sheets are eliminated, said at least one conduit means being instead equiped with at least two longitudinal fins, said fins spanning between positions, along said at least one conduit means, formerly occupied by said set of inner tubesheets.

22. A liquid-cooling system according to claim 8 in which said supercooled liquid is supercooled water, the flow of said supercooled water being changed into a flow of supercooled droplets, said change being a major perturbation, all of said supercooled droplets thus rapidly becoming droplets containing a mixture of dendritic ice and 0° C. water, proportion of said dendritic ice in said droplets then growing because of cold ambiant air, until said droplets become practically 100% ice crystals, said liquid-cooling system thus becoming a snow-making machine.

23. A liquid-cooling system according to claim 22 in which said droplets containing a mixture of dendritic ice and 0° C. water are instead used as seeders which facilitate the crystallization of other cold water droplets.

24. A liquid-cooling system according to claim 12 in which said supercooled liquid exiting from said cooler is supercooled water at about −0.8° C., said ice crystals, when separated from said mixture, having the look and feel of natural snow, said liquid-cooling system thus becoming a snow-making machine capable of operating independently of weather conditions.

25. A liquid-cooling system according to claim 2 in which said cold medium is a refrigerant mixture of the non-azeotropic type, said liquid-cooling system also comprising a low-pressure reformer, said reformer being a reservoir capable of containing said refrigerant in its liquid phase and in its vapor phase, said vapor phase occupying upper part of said reformer, said liquid phase occupying the bottom part of said reformer, said vapor phase being entrained, compressed, condensed, and expanded inside the hot-side portion of said liquid-cooling system, the composition of said vapor phase being rich in the more volatile, higher density components of said mixture, said liquid phase being entrained, circulated and evaporated inside the cold-side portion of said liquid-cooling system, said circulation being carried out by a refrigerant pump, said pump being capable over-feeding said cooler, the composition of said liquid phase being rich in the less volatile, higher latent heat components of said mixture.

26. A liquid-cooling system according to claim 25 in which the condensation of said refrigerant mixture in said hot-side portion is performed using an overfed condenser, said liquid-cooling system comprising three different interconnected circuits, the first of said interconnected circuits being a low-pressure circuit featuring said cooler, said refrigerant pump and said low-pressure reformer, the third of said interconnected circuits being a high-pressure circuit comprising a blower, said overfed condenser and a high-pressure reformer, said high-pressure reformer being a high-pressure reservoir capable of containing said refrigerant in its liquid phase and in its vapor phase the second of said interconnected circuits, linking said first and said third interconnected circuits and also comprising said low-pressure reformer, a compressor, said high-pressure reformer and an expansion device, said blower being capable of overfeeding said condenser in such a way that said refrigerant exiting from said condenser has a liquid part and vapor part, said liquid part accumulating at the bottom of said high-pressure reformer, said vapor part occupying the upper portion of said high-pressure reformer, said vapor part being recirculated by said blower into said condenser, said liquid part being sent to said low-pressure reformer via said expansion device, said high-pressure reformer also being fed with refrigerant vapor by said compressor, said condensing system thus being capable of partially separating the dense, volatile components from the light, non-volatile components of said non-azeotropic refrigerant mixtures, said dense, volatile components in said vapor part going back into said high-pressure circuit, resulting in a better heat-transfer coefficient in said condenser, said light, non-volatile components in said liquid part going towards said low-pressure reformer via said expansion device.

27. A liquid-cooling system according to claim 1, operating as a vapor-compression chiller, the liquid circuit of said vapor-compression chiller being arranged in cascade fashion with and downstream of a conventional absorption chiller, thus forming a hybrid-cascade system, the capacity of said conventional absorption chiller being sufficiently large to generate enough chilled liquid both for the hot side and for the cold side of said vapor-compression chiller, said chilled liquid normally exiting from said conventional absorption chiller at a temperature of approximately 6° C., said cooler of said vapor-compression chiller then being capable of cooling said chilled liquid from approximately 6° C. down to its liquid-solid equilibrium temperature.

28. A liquid-cooling system according to claim 8 operating as a vapor-compression chiller the liquid circuit of said vapor-compression chiller being arranged in cascade fashion with and downstream of a conventional absorption chiller, thus forming a hybrid-cascade system, the capacity of said absorption chiller being sufficiently large to provide enough chilled liquid both for the hot side and for the cold side of said vapor-compression chiller, said chilled liquid normally exiting at a temperature of approximately 6° C., said cooler of said vapor-compression chiller then being capable of supercooling said chilled liquid from said temperature of approximately 6° C. down to temperatures below its liquid-solid equilibrium temperature.

29. A liquid-cooling system according to claim 8 in which said at least one conduit means of said supercooler are provided with individual extensions, said at least one conduit means of said cooler thus extending past said outer tubesheet of said pair of spaced-apart tubesheets at said inlet end, said individual extensions permitting the feeding of said at least one conduit means individually, using a distributor located at some distance upstream of said cooler, said extensions and said distance preventing said liquid which is stagnant or which flows therein at a velocity lower than said average velocity from contacting a cold surface, thus rendering unnecessary the presence of said inner tubesheet of said pair of spaced-apart tubesheets at said inlet end.

30. A liquid-cooling system according to claim 20 in which said heat pump is used within a water-conditioning circuit for conditioning water in fish hatcheries and other similar applications, heating in winter, and cooling in summer, being mostly performed passively in a conditioning heat exchanger, said heating in winter being also partly performed actively using said hot-side heat exchanger of said heat pump, said cooling in summer being also partly performed actively using said cold-side heat exchanger of said heat pump, cold fresh liquid water at a temperature of about 0° C. in said winter being first circulated inside said conditioning heat exchanger where it picks up heat energy, said fresh liquid water then being circulated inside said hot-side heat exchanger of said heat pump where it picks up more heat energy, said fresh liquid water then exiting at a temperature suitable for entering fish reservoir, overflowing warm gray water, exiting from said fish reservoir, then being first circulated through said conditioning heat exchanger where it loses some of its heat energy to said fresh liquid water, said gray water then being circulated through said supercooler where it loses more heat energy, said gray water exiting from said supercooler at temperatures below 0° C. during startup conditions in said winter, said gray water exiting from said supercooler at about 0° C. during stable operating conditions during said winter, said gray water then being disposed of, positions, within said water-conditioning circuit, of said cold-side heat exchanger of said heat pump and of said hot-side heat exchanger of said heat pump being inversed during said summer, when cooling of said fresh water is instead required.

31. A liquid-cooling system according to claim 2 in which said inlet head and said outlet head of said cooler are redesigned in such way that said cooler becomes a multi-tubeside-pass cooler in which said liquid being cooled can pass a plurality of times.

32. A liquid-cooling system according to claim 2 in which said cooler is the cold-side heat exchanger of a heat pump, energy extracted from said liquid being transfered to the hot-side of said heat pump, said energy then being rejected at said hot side of said heat pump and used for heating purposes.

33. A liquid-cooling system according to claim 2 in which said at least one conduit means of said cooler are provided with individual extensions, said at least one conduit means of said cooler thus extending past said outer tubesheet of said pair of spaced-apart tubesheets at said outlet end, cover of said cooler head at said outlet end of said cooler thus becoming superfluous, said liquid exiting from said cooler being fed by said individual extensions to a location where it is needed, said individual extensions eliminating regions of said stagnant liquid and eliminating regions where said cooled liquid flows at a velocity lower than said average velocity, thus rendering unnecessary inner tubesheet of said pair of spaced-apart tubesheets at said outlet end of said cooler, extremity of said individual extensions where said cooled liquid exits being equipped in such a way as to prevent the formation of ice crystals at said extremity, said extremity being colder than its ambiance, said cooler thus being capable of safely bringing said liquid to a temperature below its solid-liquid equilibrium temperature without provoking said freeze-ups, said liquid thus being transformed into a supercooled liquid, said cooler thus being transformed into a supercooler and said liquid-cooling system thus being transformed into a superchiller.

34. A liquid-cooling system according to claim 33 in which said cooler is the cold-side heat exchanger of a heat pump, energy extracted from said liquid then being rejected by the hot-side heat exchanger of said heat pump and used for heating purposes, said heat pump thus being capable of using, as a source of heat, liquids at their solid-liquid equilibrium temperature.

35. A liquid-cooling system according to claim 33 in which said supercooled liquid exiting from said supercooler is made to partially change phase, said change of phase providing a slurry of cold liquid and crystals, said slurry being at its phase-equilibrium temperature, said crystals being accumulated until the desired solid/liquid ratio is achieved, said slurry being kept homogeneous and in constant motion by a mixing device, said slurry then being easily pumpable towards an other location.

* * * * *